(12) United States Patent
Repasky

(10) Patent No.: US 8,287,762 B2
(45) Date of Patent: Oct. 16, 2012

(54) OPERATION OF STAGED MEMBRANE OXIDATION REACTOR SYSTEMS

(75) Inventor: John Michael Repasky, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 12/753,580

(22) Filed: Apr. 2, 2010

(65) Prior Publication Data

US 2011/0240924 A1    Oct. 6, 2011

(51) Int. Cl.
C01B 3/38        (2006.01)
C01B 3/24        (2006.01)

(52) U.S. Cl. .................................. 252/373; 423/650

(58) Field of Classification Search .................. 252/373
See application file for complete search history.

(56) References Cited

U.S. PATENT DOCUMENTS

| | | | |
|---|---|---|---|
| 4,620,940 A | 11/1986 | Quang et al. | |
| 5,269,822 A | 12/1993 | Carolan et al. | |
| 5,820,655 A | 10/1998 | Gottzmann et al. | |
| 5,837,125 A | 11/1998 | Prasad et al. | |
| 5,865,878 A | 2/1999 | Drnevich et al. | |
| 6,010,614 A | 1/2000 | Keskar et al. | |
| 6,048,472 A | 4/2000 | Nataraj et al. | |
| 6,106,591 A | 8/2000 | Keskar et al. | |
| 6,214,066 B1 | 4/2001 | Nataraj et al. | |
| 6,402,988 B1 | 6/2002 | Gottzmann et al. | |
| 6,492,290 B1 | 12/2002 | Dyer et al. | |
| 6,527,980 B1 | 3/2003 | Roden et al. | |
| 6,695,983 B2 | 2/2004 | Prasad et al. | |
| 7,122,072 B2 | 10/2006 | Carolan et al. | |
| 7,179,323 B2 | 2/2007 | Stein et al. | |
| 7,279,027 B2 | 10/2007 | Carolan et al. | |
| 7,686,856 B2 | 3/2010 | Hemmings et al. | |
| 2002/0141917 A1 | 10/2002 | Komaki et al. | |
| 2002/0155061 A1 | 10/2002 | Prasad et al. | |
| 2003/0039601 A1 | 2/2003 | Halvorson et al. | |
| 2003/0198592 A1 | 10/2003 | Allison et al. | |
| 2004/0186018 A1 | 9/2004 | Carolan et al. | |
| 2005/0031531 A1 | 2/2005 | Stein et al. | |
| 2006/0180022 A1 | 8/2006 | Holmes et al. | |

(Continued)

FOREIGN PATENT DOCUMENTS

EP    0875284 A1    11/1998

(Continued)

OTHER PUBLICATIONS

Fjellvag, H., et al., "Carbonatizatin of YBa2Cu2O6+x", Acta Chemica Scandinavica, vol. A42, 1988, pp. 178-184, XP-002565598.

*Primary Examiner* — Melvin C Mayes
*Assistant Examiner* — Kenneth Vaden
(74) *Attorney, Agent, or Firm* — Bryan C. Hoke, Jr.

(57) ABSTRACT

A method of operating a multi-stage ion transport membrane oxidation system. The method comprises providing a multi-stage ion transport membrane oxidation system with at least a first membrane oxidation stage and a second membrane oxidation stage, operating the ion transport membrane oxidation system at operating conditions including a characteristic temperature of the first membrane oxidation stage and a characteristic temperature of the second membrane oxidation stage; and controlling the production capacity and/or the product quality by changing the characteristic temperature of the first membrane oxidation stage and/or changing the characteristic temperature of the second membrane oxidation stage.

8 Claims, 9 Drawing Sheets

U.S. PATENT DOCUMENTS

2007/0292342 A1 12/2007 Hemmings et al.
2008/0302013 A1 12/2008 Repasky et al.

FOREIGN PATENT DOCUMENTS

| EP | 882670 A1 * | 12/1998 |
|---|---|---|
| EP | 1245532 A2 | 10/2002 |
| EP | 1504811 A1 | 2/2005 |
| EP | 0875285 B1 | 3/2005 |
| EP | 1 637 215 A2 | 3/2006 |
| EP | 1 775 260 A2 | 4/2007 |
| EP | 0155867 A1 | 12/2008 |
| JP | 200463341 A | 2/2004 |
| RU | 2177822 C2 | 1/2002 |
| WO | 02/16015 A1 | 2/2002 |
| WO | 03/080229 A1 | 10/2003 |

* cited by examiner

OPERATION OF STAGED MEMBRANE OXIDATION REACTOR SYSTEMS

STATEMENT REGARDING FEDERALLY SPONSORED RESEARCH OR DEVELOPMENT

This invention was made with government support under Contract Number DE-FC26-97FT96052 between Air Products and Chemicals, Inc. and the U.S. Department of Energy. The Government has certain rights to this invention.

BACKGROUND

The permeation of oxygen ions through ceramic ion transport membranes is the basis for the design and operation of high-temperature oxidation reactor systems in which permeated oxygen is reacted with oxidizable compounds to form oxidized or partially-oxidized reaction products. The practical application of these oxidation reactor systems requires membrane assemblies having large surface areas, flow passages to contact oxidant feed gas with the oxidant sides of the membranes, flow passages to contact reactant feed gas with the reactant sides of the membranes, and flow passages to withdraw product gas from the permeate sides of the membranes. These membrane assemblies may comprise a large number of individual membranes arranged and assembled into modules having appropriate gas flow piping to introduce feed gases into the modules and withdraw product gas from the modules. Ion transport membrane assemblies may be fabricated, for example, in either planar or tubular configurations.

The production of synthesis gas (syngas) in ion transport membrane (ITM) oxidation reactor systems combines the unit operations for oxygen separation and high-temperature syngas generation into a single process. In the ITM oxidation reactor system or ITM syngas reactor, oxygen selectively permeates across a mixed-conducting membrane from an oxygen-containing stream, e.g. air, on the cathode side of the membrane to subsequently react with reactants on the anode side of the membrane. Primary reactants may include oxygen, steam, hydrocarbons, pre-reformed mixtures of steam and hydrocarbon feed gas, hydrogen, carbon monoxide, carbon dioxide, and/or carbon dioxide-containing gas.

A number of exothermic and endothermic reactions occur in the process including partial oxidation, complete oxidation, steam reforming, carbon dioxide reforming, and water-gas shift to produce the synthesis gas product. ITM oxidation reactors typically operate in a narrow temperature range, for example, 700° C. to 1000° C. (1292° F. to 1832° F.). A description of a representative staged ITM reactor system and operation is given in U.S. Patent Application Publication No. 2008/0302013 A1 entitled "Staged Membrane Oxidation Reactor System". This system can be operated to provide a stable ITM syngas process which may be controlled to operate at design conditions, including design production capacity and design feedstock conversion to valuable products, within the required temperature constraints.

An ITM syngas reactor system may be designed to yield a syngas product having a desired product composition and product flow rate wherein the system operates at a preferred feed hydrocarbon conversion. The design conditions are selected for efficient operation with a given feedstock to yield the specified product quality and production capacity over a satisfactory membrane operating life. For commercial and/or operational reasons, it may be necessary to operate the ITM reactor system at off-design or alternate conditions for certain time periods. For example, periods of turndown operation at reduced production rates may be needed due to lower requirements of the downstream syngas consumption process. In another example, changes in syngas composition may be required for specific operational reasons. Other situations can be envisioned in which off-design or alternate operation is required for varying time periods.

It is desirable to select the operating conditions used during periods of off-design or alternate operation to prevent or minimize damage to the membranes, to minimize potential reduction in membrane life, and to provide the desired syngas product quality at a desired efficiency.

There is a need in the art of synthesis gas generation by ITM oxidation reactor systems for effective, efficient, and reliable methods for operating and controlling the systems at off-design or alternate operating conditions. In particular, there is a need for off-design or alternate operational methods for ITM reactor systems having multiple stages or groups of stages arranged and operated in series. The embodiments of the invention disclosed and claimed herein provide off-design or alternate operating methods to address these needs.

BRIEF SUMMARY

The present disclosure relates to a method of operating a multi-stage ion transport membrane oxidation system.

There are several aspects of the disclosure as outlined below.

Aspect #1. A method of operating a multi-stage ion transport membrane oxidation system comprising:
  (a) providing a multi-stage ion transport membrane oxidation system comprising at least a first membrane oxidation stage and a second membrane oxidation stage, wherein
    (a1) the first membrane oxidation stage comprises a reactant zone having a reactant feed gas inlet and an interstage reactant gas outlet,
    (a2) the second membrane oxidation stage comprises a reactant zone having an interstage reactant gas inlet in flow communication with the interstage reactant gas outlet of the first membrane oxidation stage and a product gas outlet, and
    (a3) an interstage feed gas inlet in flow communication with the reactant zone of the second membrane oxidation stage;
  (b) operating the ion transport membrane oxidation system at operating conditions including a characteristic temperature of the first membrane oxidation stage and a characteristic temperature of the second membrane oxidation stage by
    (b1) introducing a reactant feed gas into the reactant feed gas inlet of the first stage,
    (b2) withdrawing an interstage reactant gas from the interstage reactant gas outlet of the first stage and introducing the interstage reactant gas into the interstage reactant gas inlet of the second membrane oxidation stage,
    (b3) introducing a reactant interstage feed gas into the interstage feed gas inlet of the second membrane oxidation stage; and
    (b4) withdrawing a product gas stream from the product gas outlet of the second membrane oxidation stage;
  wherein the ion transport membrane oxidation system provides the product gas at a production capacity and a product quality; and
  (c) controlling the production capacity and/or the product quality by changing the characteristic temperature of the first membrane oxidation stage and/or changing the characteristic temperature of the second membrane oxidation stage by a method selected from the group consisting of
(c1) decreasing the characteristic temperature of the first membrane oxidation stage to decrease the production capacity;
(c2) decreasing the characteristic temperature of the second membrane oxidation stage to decrease the production capacity and decrease the product quality;
(c3) decreasing the characteristic temperature of the first membrane oxidation stage and decreasing characteristic temperature of the second membrane oxidation stage to decrease the production capacity and decrease the product quality;
(c4) increasing the characteristic temperature of the first membrane oxidation stage to increase the production capacity;
(c5) increasing the characteristic temperature of the second membrane oxidation stage to increase the production capacity and increase the product quality;
(c6) increasing the characteristic temperature of the first membrane oxidation stage and increasing the characteristic temperature of the second membrane oxidation stage to increase the production capacity and increase the product quality;
(c7) decreasing the characteristic temperature of the first membrane oxidation stage and increasing the characteristic temperature of the second membrane oxidation stage to increase the product quality;
(c8) increasing the characteristic temperature of the first membrane oxidation stage and decreasing the characteristic temperature of the second membrane oxidation stage to decrease the product quality.

Aspect #2. A method as defined in aspect #1 wherein the production capacity and/or the product quality is controlled by decreasing the characteristic temperature of the first membrane oxidation stage to decrease the production capacity. The characteristic temperature of the second membrane oxidation stage and/or any of the remaining membrane oxidation stages of the multi-stage ion transport membrane oxidation system may be kept substantially unchanged.

Aspect #3. A method as defined in aspect #1 wherein the production capacity and/or the product quality is controlled by decreasing the characteristic temperature of the second membrane oxidation stage to decrease the production capacity and decrease the product quality. The characteristic temperature of the first membrane oxidation stage and/or any of the remaining membrane oxidation stages of the multi-stage ion transport membrane oxidation system may be kept substantially unchanged.

Aspect #4. A method as defined in aspect #1 wherein the production capacity and/or the product quality is controlled by decreasing the characteristic temperature of the first membrane oxidation stage and decreasing characteristic temperature of the second membrane oxidation stage to decrease the production capacity and decrease the product quality. The characteristic temperature of any of the remaining membrane oxidation stages of the multi-stage ion transport membrane oxidation system may be kept substantially unchanged.

Aspect #5. A method as defined in aspect #1 wherein the production capacity and/or the product quality is controlled by increasing the characteristic temperature of the first membrane oxidation stage to increase the production capacity. The characteristic temperature of the second membrane oxidation stage and/or any of the remaining membrane oxidation stages of the multi-stage ion transport membrane oxidation system may be kept substantially unchanged.

Aspect #6. A method as defined in aspect #1 wherein the production capacity and/or the product quality is controlled by increasing the characteristic temperature of the second membrane oxidation stage to increase the production capacity and increase the product quality. The characteristic temperature of the first membrane oxidation stage and/or any of the remaining membrane oxidation stages of the multi-stage ion transport membrane oxidation system may be kept substantially unchanged.

Aspect #7. A method as defined in aspect #1 wherein the production capacity and/or the product quality is controlled by increasing the characteristic temperature of the first membrane oxidation stage and increasing the characteristic temperature of the second membrane oxidation stage to increase the production capacity and increase the product quality. The characteristic temperature of any of the remaining membrane oxidation stages of the multi-stage ion transport membrane oxidation system may be kept substantially unchanged.

Aspect #8. A method as defined in aspect #1 wherein the production capacity and/or the product quality is controlled by decreasing the characteristic temperature of the first membrane oxidation stage and increasing the characteristic temperature of the second membrane oxidation stage to increase the product quality. The characteristic temperature of any of the remaining membrane oxidation stages of the multi-stage ion transport membrane oxidation system may be kept substantially unchanged.

Aspect #9. A method as defined in aspect #1 wherein the production capacity and/or the product quality is controlled by increasing the characteristic temperature of the first membrane oxidation stage and decreasing the characteristic temperature of the second membrane oxidation stage to decrease the product quality. The characteristic temperature of any of the remaining membrane oxidation stages of the multi-stage ion transport membrane oxidation system may be kept substantially unchanged.

Aspect #10. A method as defined in any one of aspects #1 to #9 wherein the reactant feed gas comprises water and one or more hydrocarbons, the reactant interstage feed gas comprises one or more hydrocarbons, and the product gas stream comprises hydrogen and carbon monoxide.

Aspect #11. A method as defined in any one of aspects #1 to #10 wherein the production capacity is defined as the combined molar flow rate of the hydrogen and carbon monoxide contained in the product gas stream.

Aspect #12. A method as defined in any one of aspects #1 to #11 wherein the product gas quality is defined by any of
(a) the mole fraction of hydrogen plus the mole fraction of carbon monoxide in the product gas stream,
(b) the conversion of the one or more hydrocarbons in the reactant feed gas and the reactant interstage feed gas, and
(c) the ratio $(x_{CO}+x_{H2})/(1-x_{H2O})$ where x is the mole fraction of the designated component.

Aspect #13. A method as defined in any one of aspects #1 to #12 wherein each stage of the multi-stage ion transport membrane oxidation system comprises an oxidant zone, one or more ion transport membranes separating the reactant zone from the oxidant zone, an oxidant gas inlet, and an oxygen-depleted oxidant gas outlet.

Aspect #14. A method as defined in aspect #13 comprising introducing an oxidant gas into the oxidant gas inlet of any stage and withdrawing an oxygen-depleted oxidant gas from that stage.

Aspect #15. A method as defined in aspect #14 wherein the characteristic temperature of any stage is controlled by changing one or more operating parameters selected from the group consisting of the reactant feed gas flow rate, the reactant feed gas composition, the reactant feed gas temperature, the reactant interstage feed gas flow rate, the reactant interstage feed gas composition, the reactant interstage feed gas temperature, the interstage reactant gas temperature, and the temperature of the oxidant gas to any stage.

Aspect #16. A method as defined in any one of aspects #1 to #15 wherein the multi-stage ion transport membrane oxidation system comprises between 3 and 500 stages, inclusive.

Aspect #17. A method as defined in any one of aspects #1 to #15 wherein the multi-stage ion transport membrane oxidation system comprises greater than 100 stages.

Aspect #18. A method as defined in any one of aspects #1 to #17 wherein the multi-stage ion transport membrane oxidation system comprises one or more catalysts disposed within any reactant zone and/or in the interstage reactant gas flow path between the first and second stages.

Aspect #19. A method as defined in aspect #18 wherein the one or more catalysts are selected from the group consisting of oxidation catalyst, steam reforming catalyst, carbon dioxide reforming catalyst, and water gas shift catalyst.

Aspect #20. A method as defined in any one of aspects #1 to #19 wherein the reactant interstage feed gas and the reactant feed gas are provided as portions of the same reactant gas stream.

Aspect #21. A method as defined in any one of aspects #1 to #19 wherein the reactant interstage feed gas and the first reactant feed gas are obtained from different sources.

Aspect #22. A method as defined in any one of aspects #1 to #21 wherein the reactant interstage feed gas comprises carbon dioxide.

Aspect #23. A method as defined in any one of aspects #1 to #21 wherein the reactant feed gas and/or the reactant interstage feed gas comprises natural gas and/or pre-reformed natural gas.

DETAILED DESCRIPTION

Figure 1:
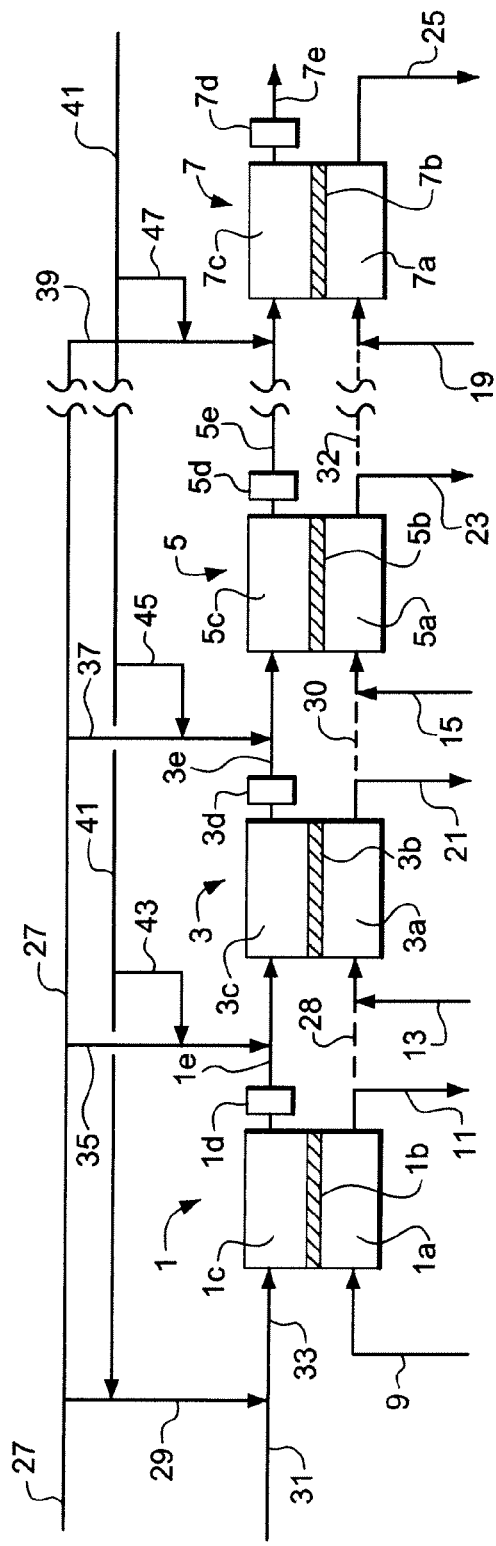
FIG. 1 is a schematic flow diagram of a generic ITM oxidation system that can be operated according to disclosed embodiments.

Membrane oxidation reactor systems typically utilize partial oxidation, complete oxidation, steam reforming, carbon dioxide reforming, water-gas shift, and/or various combinations of these reactions to produce synthesis gas. Certain of these reactions are strongly exothermic and others are endothermic. Because ITM oxidation reactor systems generally require a narrow operating temperature range, proper control of the exothermic and endothermic reactions is required. Proper temperature control is essential when ITM oxidation systems are operated at off-design or alternate conditions, and methods for such control are described below for the operation of reactant-staged ITM oxidation systems with interstage feed wherein the stage modules are operated in series.

It has been found that when exothermic reactions occur between permeated oxygen and reactive components, in particular for the production of synthesis gas from methane, the degree of reactant conversion across an individual membrane must be limited to prevent an excessive temperature gradient across the membrane. It also has been found that when a membrane is transporting oxygen, the amount of oxygen extraction across an individual membrane must be limited to prevent an excessive oxygen vacancy gradient in the membrane material between the leading edge and trailing edge of the membrane. Excessive temperature or oxygen vacancy gradients may cause excessive stresses in the membranes that could seriously limit the membrane life.

This is achieved by utilizing multiple reactor stages so that the reactant conversion in each stage may be controlled, the amount of oxygen extracted across membranes in each module may be kept sufficiently low to prevent an excessive oxygen vacancy gradient in the membrane material, and if required the partial pressure of carbon dioxide in contact with the membranes may be maintained below a critical partial pressure. A reactor stage may comprise multiple membrane modules arranged in parallel and/or series. The amount of oxygen extracted across each individual module may be limited by appropriate module sizing, and the total desired degree of oxygen extraction within a stage may be achieved by operating a selected plurality of modules within a stage.

The total desired feed conversion in the system may be achieved by utilizing a plurality of reactor stages in series wherein each stage is operated so that the degree of reactant conversion in each stage is controlled at a selected value and may approach chemical equilibrium. This may be accomplished by introducing portions of the reactant gas into two or more stages of a multiple-stage reactor system wherein each stage may comprise multiple membrane modules arranged in series and/or parallel. The degree of reactant conversion across each individual module in a stage may be controlled by appropriate module sizing and/or feed gas flow rates. Recycle gas from downstream synthesis gas conversion processes or reactant gas from other sources may be introduced into the membrane reactor system as additional reactant gas to increase overall conversion and/or to control temperatures in selected stages. This recycle gas may contain carbon dioxide, and the partial pressure of this carbon dioxide at any point in the reactor may be controlled to prevent membrane degradation if necessary. In certain cases in which the recycle gas contains carbon dioxide, it may be preferable to vary the amount of recycle gas so as to control the ratio of $H_2$ to CO in the syngas product.

Efficient, flexible, and reliable operation of ITM oxidation reactor systems is required in the generation of synthesis gas for commercial applications at system design conditions as well as off-design or alternate conditions. The embodiments described herein provide methods to control the operation of staged membrane oxidation reactor systems at off-design or alternate conditions so that production capacity, product quality, and feedstock conversion to valuable products are simultaneously and independently controlled. It is important to control the operation of ITM oxidation reactor systems during off-design or alternate operating time periods to increase or reduce production capacity, increase or reduce production capacity, and/or to extend membrane life.

When operating ITM membrane oxidation reactor systems at off-design or alternate conditions, it is critical to control membrane temperatures to avoid the problems described above while achieving the desired off-design or alternate production rate and product quality. The embodiments described herein provide methods of operating a staged membrane oxidation reactor system so that production capacity and feedstock conversion to valuable syngas product can be controlled simultaneously and independently by regulating the temperature profile across the staged reactor system. These methods can be used in the operation of any multi-staged ITM oxidation reactor system in which the stages are operated in series with interstage feed between at least two of the stages. Exemplary systems for application of the embodiments described herein are disclosed in U.S. Patent Application Publication No. 2008/0302013 A1, which is incorporated herein by reference.

The oxygen flux through ion transport membranes, as suggested by Wagner's Law, is proportional to the driving force of the natural logarithm of the ratio of the oxygen partial pressures on either side of the membrane, i.e., ln $(P_{O2,1}/P_{O2,2})$. While this driving force dependency results in high flux rates, it also makes capacity control of ITM ion transport membrane reactor systems extremely difficult using traditional means of pressure control such as controlling oxygen flux by varying the upstream oxygen-containing fluid pressure and/or downstream fluid pressure.

For example, an ITM oxidation syngas reactor provided with an ambient air feed containing 21 vol % oxygen at 10 psig (24.7 psia, 1.68 atm) and discharging a non-permeate oxygen-depleted gas to atmosphere at 0 psig (14.7 psia, 1 atm) with an 85% recovery of oxygen has a typical oxygen partial pressure of 0.3528 atm in the feed air and 0.0383 atm in the non-permeate discharge. Typical oxygen partial pressure in the reactant side of the membrane reactor may be on the order of $10^{-16}$ atm, and it is extremely difficult to control this oxygen partial pressure directly because of extremely fast oxidation reactions. Thus, in this example, the feed end driving force ln $(P_{O2,1}/P_{O2,2})$ is 35.80, the discharge end driving force ln $(P_{O2,1}/P_{O2,2})$ is 33.58, and a simple average driving force is 34.69. The large change in oxygen concentration associated with 85% oxygen recovery from the oxygen-containing feed gas has only a nominal 6% impact on the driving force for oxygen flux from the feed air to the non-permeate discharge.

Doubling the feed air pressure to 20 psig (34.7 psia, 2.36 atm) and operating with the same 10 psi pressure drop to discharge at 10 psig (24.7 psia, 1.68 atm) with the same 85% oxygen recovery yields a feed end driving force ln $(P_{O2,1}/P_{O2,2})$ of 37.70, discharge end driving force ln $(P_{O2,1}/P_{O2,2})$ of 34.10, and a simple average driving force of 35.90. Doubling the feed air pressure (at appreciable cost) yields less than 5% change in the simple average oxygen flux driving force. The use of large changes in feed air pressure for controlling production capacity is not economical and introduces potential complexity into the design and operability for commercial application. For example, piping must be designed for high pressure operation, operation at high pressure requires compression and associated power, and overpressure of the system could occur.

The above discussion illustrates that the use of total pressure or oxygen partial pressure as a primary parameter to control oxygen flux and associated production capacity in an ITM membrane oxidation reactor system has serious limitations. Alternative methods of controlling system operation at off-design or alternate conditions, including turndown operation at reduced oxygen flux, are described below.

The following definitions apply to terms used in the description and claims for the embodiments presented herein.

An ion transport membrane module is an assembly of a plurality of ion transport membrane structures that has a gas inflow region and a gas outflow region disposed such that gas can flow across the external surfaces of the membrane structures. The plurality of ion transport membrane structures also may have a gas inflow region and a gas outflow region disposed such that gas can flow across the internal surfaces of the membrane structures. Gas flowing from the inflow region to the outflow region of a membrane module may change in composition as it passes across the surfaces of the membrane structures in the module. Each membrane structure has an oxidant gas feed side or zone, also described as the oxidant or cathode side, and a reactant, permeate, or anode side or zone separated by an active membrane layer or region that allows oxygen ions to permeate through the membrane and react with reactive components on the reactant side. In one exemplary type of membrane module design, each module has an interior region and an exterior region wherein the oxidant gas feed flows through the interior region and the reactant gas flows through the exterior region of the membrane structure.

An ion transport membrane comprises an active layer of ceramic membrane material comprising mixed metal oxides capable of transporting or permeating oxygen ions at elevated temperatures. The ion transport membrane also may transport electrons in addition to oxygen ions, and this type of ion transport membrane typically is described as a mixed conductor membrane. The ion transport membrane also may be a composite membrane comprising a layer of dense active membrane material and one or more layers of porous or channeled support layers.

The terms "stage", "reaction stage", "membrane oxidation stage", and "reactor stage" in a multi-stage membrane oxidation system are equivalent and are defined as an assembly of one or more membrane modules arranged in parallel and/or series within the stage wherein each stage comprises (1) a reactant side or zone (these terms are equivalent), (2) an oxidant side or zone, (3) one or more ion transport membranes separating the oxidant zone from the reactant zone, (4) a reactant gas inlet or inlet region in flow communication with the reactant zone, and (5) a reactant gas outlet or outlet region in flow communication with the reactant zone. More specifically, each stage may have a reactant feed gas inlet or inlet region (if it is the first stage), an interstage reactant gas stream inlet or inlet region (if it is not the first stage), an interstage reactant gas stream outlet or outlet region (if it is not the last stage), and a product gas outlet or outlet region (if it is the last stage). Each stage also has one or more oxidant gas inlets or inlet regions in flow communication with the oxidant zone and one or more oxygen-depleted oxidant gas outlets or outlet regions in flow communication with the oxidant zone.

The one or more ion transport membranes separating the oxidant zone from the reactant zone allow the permeation of oxygen ions through the membrane, and the dense active membrane material does not allow any substantial bulk flow of gas between the oxidant and reactant zones of the stage. Small but acceptable leaks in the membrane may occur in some cases.

A stage may have any number of individual membrane modules arranged in series and/or parallel flow arrangement with respect to the reactant gas streams. Reactant gas is introduced into the stage inlet, is distributed among the modules in the stage, and passes through the reactant sides of the modules. The effluent gas from the modules is withdrawn via the stage outlet. A stage may include one or more catalysts to enhance the reactions occurring therein; catalysts may include any of oxidation catalyst, steam reforming catalyst, carbon dioxide reforming catalyst, and water gas shift catalyst. Catalyst may be disposed (1) following the reactant zone of any stage and/or (2) downstream of any membrane module within any stage and/or (3) upstream of any membrane module within any stage and/or (4) within or between the modules within any stage in any desired configuration.

A multi-stage membrane oxidation system comprises two or more stages and operates in series with respect to the gas flow through the reactant sides or zones of the stages, i.e., the system is reactant-staged. A reactant-staged membrane reactor system is defined as a system comprising two or more membrane stages arranged in series with respect to the flow of reactant gases through the system wherein the reactant gas effluent flows from the outlet region of one stage into the inlet region of another stage immediately downstream. Reactant feed gas enters the first stage, product gas is withdrawn from the last stage, and an interstage reactant gas stream flows between each pair of series stages. A reactant interstage feed gas comprising additional reactant gas may be introduced into at least one interstage reactant gas stream and may be introduced into any of the interstage reactant gas streams in the multi-stage reactor system.

A reactant gas is defined as a gas comprising one or more reactive components that participate in any of the reactions (1) that occur in the reactant zone of a membrane oxidation reactor stage and (2) that may occur in a catalyst region following or preceding the reactant zone of the membrane oxidation reactor stage. The reactions in the reactant zone may occur (1) between oxygen permeated through the membrane and any of the reactive components and (2) among any of the reactive components. These reactions form reaction products that may be withdrawn as outlet or product gas from any stage of a staged reactor system.

The term "hydrocarbon" is defined as a compound comprising at least hydrogen and carbon atoms. The term "oxygenated hydrocarbon" is defined as a compound comprising at least hydrogen, carbon, and oxygen atoms.

The term "pre-reformed natural gas" means the reaction products from the catalytic reforming of a portion of the hydrocarbons in a natural gas stream. Pre-reformed natural gas typically comprises methane, carbon monoxide, carbon dioxide, hydrogen, and water. Pre-reforming of natural gas may be carried out to convert and decompose hydrocarbons heavier than methane for the purpose of eliminating coking in downstream reforming or partial oxidation processes. The terms "pre-reforming" and "pre-reformed" mean the partial reforming of a hydrocarbon-containing stream prior to further reaction in a membrane reactor system. The terms "pre-reforming" or "pre-reformed" also may be defined as the catalytic reaction of water and/or carbon dioxide with a portion of the hydrocarbons in a hydrocarbon-containing stream, particularly hydrocarbons heavier than methane, to form reformed products.

In one embodiment, a staged reactor system is operated to generate a synthesis gas product comprising hydrogen and carbon monoxide. This embodiment utilizes a first reactant gas comprising one or more hydrocarbons and a second reactant gas comprising steam (vaporized water). A first reactant gas may be natural gas comprising mostly methane and smaller concentrations of hydrocarbons having 2 to 6 carbon atoms; another first reactant gas may be methane-rich gas resulting from pre-reforming natural gas with steam; other carbonaceous reactant gases may be used in alternative applications. Optionally, a third reactant gas may be used that comprises one or more components selected from the group consisting of oxygen, nitrogen, hydrogen, water, methane, other hydrocarbons, carbon monoxide, and carbon dioxide. The third reactant gas may be provided, for example, by offgas from a downstream process that uses the synthesis gas product as feed gas. When three reactant gases are used in this embodiment, the chief reactive components are any of methane, other hydrocarbons, water, hydrogen, carbon monoxide, and carbon dioxide.

An oxidant gas is defined as a gas comprising oxygen and other components from which oxygen can be extracted by permeation through an ion transport membrane to react with reactive components in the reactant zone. An oxygen-containing gas is a type of reactant gas that comprises one or more compounds that contain oxygen atoms such as, for example, water, carbon monoxide, and carbon dioxide.

A reactant feed gas is defined as a reactant gas introduced into the reactant zone or side of the first stage of a multi-stage membrane reactor system. An interstage reactant gas is defined as reactant gas flowing between stages, i.e., from the outlet region of the reactant zone of one stage and into the inlet region of the reactant zone of the next stage; this gas comprises reaction products and may include unreacted reactive components. The relative amounts of reactive components and oxidation products in an interstage reactant gas stream entering a given stage may depend on (1) the degree to which chemical equilibrium is approached in the previous stage and (2) the amount and composition of reactant interstage feed gas (if any) that is introduced into the interstage reactant gas to the reaction zone of the given stage.

A reactant interstage feed gas is defined as a reactant gas that is (1) introduced into the reactant zone of any stage other than the first stage or (2) mixed with an interstage reactant gas prior to entering that reactant zone. The reactant interstage feed gas may have the same composition as the reactant feed gas to the first stage or may have a different composition than the reactant feed gas. A reactant feed gas or reactant interstage feed gas typically comprises high concentrations of reactive components. A product gas is the reactant gas effluent from the reactant zone of the last stage of a multi-stage membrane reactor system, wherein the product gas comprises one or more oxidation products and also may comprise unreacted reactive components. The product gas may be, for example, synthesis gas containing at least hydrogen and carbon oxides.

A membrane module may have a configuration of multiple planar wafers in which each wafer has a center or interior region and an exterior region, wherein the wafer is formed by two parallel planar members sealed about at least a portion of the peripheral edges thereof. Oxygen ions permeate through active membrane material that may be placed on either or both surfaces of a planar wafer. Gas can flow through the center or interior region of the wafer, and the wafer has one or more gas flow openings to allow gas to enter and/or exit the interior region of the wafer. Thus oxygen ions may permeate from the exterior region into the interior region, or conversely may permeate from the interior region to the exterior region. In one embodiment, the gas in contact with the outer surfaces in the exterior regions of the membrane modules may be at a higher pressure than the gas within the interior regions of the membrane modules. Representative membrane compositions and planar membrane module configurations that may be used in the embodiments of the present disclosure are described in U.S. Pat. Nos. 7,179,323 and 7,279,027, both of which are incorporated herein by reference.

Alternatively, the membrane module may have a tubular configuration in which an oxidant gas flows in contact with one side of the tube (i.e., in either the interior region or the exterior region of the tube) and oxygen ions permeate through active membrane material in or on the tube walls to the other side of the tube. The oxidant gas may flow inside or outside of the tube in a direction generally parallel to the tube axis, or conversely may flow over the outer side of the tube in a direction which is not parallel to the tube axis. A module may comprise multiple tubes arranged in bayonet or shell-and-tube configurations with appropriate tube sheet assemblies to isolate the oxidant and reactant sides of the multiple tubes.

Modules may be arranged in series within a reactor stage wherein a number of modules are disposed along a single axis. Typically, reactant gas which has passed across the surfaces of the membrane structures in a first module flows from the outflow region of that module, after which some or all of this gas enters the inflow region of a second module and thereafter flows across the surfaces of the membrane structures in the second module. The axis of a series of single modules may be parallel or nearly parallel to the overall flow direction or axis of the gas passing over the modules in series.

Modules may be arranged within a stage in banks of two or more parallel modules wherein a bank of parallel modules lies on an axis that is not parallel to, and may be generally orthogonal to, the overall flow direction or axis of the gas passing over the modules. Multiple banks of modules may be arranged in series, which means by definition that banks of modules are disposed such that at least a portion of reactant gas which has passed across the surfaces of the membrane structures in a first bank of modules flows across the surfaces of the membrane structures in a second bank of modules.

Any number of single modules or banks of modules may be arranged in series and/or parallel within a stage. In one embodiment, the modules in a series of single modules or in a series of banks of modules may lie on a common axis or common axes in which the number of axes equals one or equals the number of modules in each bank. In another embodiment, successive modules or banks of modules in a series of modules or banks of modules may be offset in an alternating fashion such that the modules lie on at least two axes or on a number of axes greater than the number of modules in a bank, respectively. Both of these embodiments are included in the definition of modules in series as used herein.

The term "in flow communication with" as applied to a first region and second region means that fluid can flow from the first region to the second region, optionally through an intermediate region. The intermediate region may comprise connecting piping between the first and second regions or may comprise an open flow area or channel between the first and second regions. The term "connected to" as applied to a first and second region means that fluid can flow from the first region directly to the second region or through connecting piping to the second region. The term "direct flow communication" and the term "directly" as applied to a flowing fluid mean that the fluid can flow from a first region to a second region, and/or from the second region to the first region, wherein the flow path between the regions is not in flow communication with any vessel, storage tank, or process equipment, except that the fluid flow path may include piping and/or one or more flow control devices selected from orifices, valves, and other flow restriction devices.

The indefinite articles "a" and "an" as used herein mean one or more when applied to any feature in embodiments described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

A schematic flow diagram of a generic embodiment is illustrated in FIG. 1. The exemplary membrane oxidation system comprises first stage 1, second stage 3, third stage 5, and last or $n^{th}$ stage 7. Any desired number of stages may be used as long as there are at least two stages. Each stage is illustrated schematically as a generic module having an oxygen permeable membrane that divides the module into an oxidant side and a permeate or reactant side. As explained above, a stage can comprise any number of membrane modules arranged in series and/or parallel and may include one or more catalysts.

First stage 1 comprises oxidant side or zone 1a, membrane 1b, reactant side or zone 1c, optional catalyst 1d, and appropriate gas inlet and outlet regions. Optional catalyst 1d is shown here as immediately following the module. Alternatively or additionally catalyst may be disposed immediately preceding the module (not shown) or within or around the module in any desired configuration (not shown). Similarly, second stage 3 comprises oxidant side 3a, membrane 3b, reactant side 3c, appropriate gas inlet and outlet regions, and optional catalyst 3d, which is shown here as immediately following the module. Alternatively or additionally, catalyst may be disposed immediately preceding the module (not shown) or within or around the module in any desired configuration (not shown). Similarly, third stage 5 comprises oxidant side 5a, membrane 5b, reactant side 5c, appropriate gas inlet and outlet regions, and optional catalyst 5d. Optional catalyst 5d is shown here as immediately following the module. Alternatively or additionally catalyst may be disposed immediately preceding the module (not shown) or within or around the module in any desired configuration (not shown). Last or $n^{th}$ stage 7 comprises oxidant side 7a, membrane 7b, reactant side 7c, appropriate gas inlet and outlet regions, and optional catalyst 7d, shown here as immediately following the module. Alternatively or additionally, catalyst may be disposed immediately preceding the module (not shown) or within or around the module in any desired configuration (not shown). Product gas from last stage 7 is withdrawn via product line 7e.

In the illustration of FIG. 1, interstage reactant gas flows from stage 1 via flow path 1e, from stage 3 via flow path 3e, and from stage 5 via flow path 5e. In one embodiment, each of stages 1, 3, and 5 may be enclosed in a separate pressure vessel; in this case, flow paths 1e, 3e, and 5e are pipes, conduits, or closed channels between the vessels. In another embodiment, stages 1, 3, 5, and 7 may be enclosed in a single pressure vessel (not shown) such that reactant gas can flow through the reactant zones of each stage in succession; in this case, flow paths 1e, 3e, and 5e are open regions between stages through which gas can flow from the reactant gas outlet region of one stage into the reactant gas inlet region of the following stage. Each stage is adjacent a downstream stage and/or an upstream stage; the first stage is adjacent a downstream stage, the last stage is adjacent an upstream stage, and all other stages are adjacent an upstream stage and a downstream stage. The terms "upstream" and "downstream" are defined relative to the flow direction of reactant gas.

The oxidant zone and the reactant zone in each stage are isolated from each other so that the bulk flow of oxidant gas through the oxidant zone and the bulk flow of reactant gas through the reactant zone are separate and independent. The membrane or membranes separating the oxidant zone from the reactant zone prevents any substantial bulk gas flow between the zones and allows the permeation of oxygen through the membrane from the oxidant zone to the reactant zone. In some cases, small but acceptable leaks may occur through imperfections in the membrane.

An oxidant gas, for example, preheated air or oxygen-containing combustion products from a combustor operated with excess air, is introduced via oxidant inlet line 9 into oxidant side 1a of first stage 1 and contacts the oxidant side of membrane 1b, a portion of the oxygen permeates through membrane 1b, and oxygen-depleted gas exits first stage 1 via oxygen-depleted oxidant outlet line 11. Similarly, additional oxidant gas streams may be introduced via lines 13, 15, and 19 into stages 3, 5, and 7, respectively, and oxygen-depleted gas may exit the stages via lines 21, 23, and 25, respectively. Alternatively, some or all of the oxidant gas may flow through two or more stages in series via lines 28, 30, and 32. In one embodiment, for example, oxidant gas may flow through lines 9, 27, and 21 such that stages 1 and 3 operate in series with respect to oxidant gas; similarly, a single oxidant stream may provide oxidant to a pair of downstream stages. Thus the stages may be operated individually with respect to the flow of oxidant gas, may be operated in series with respect to the flow of oxidant gas, or may utilize any combination of individual and series operation with respect to the flow of oxidant gas. Oxidant gas inlet and outlet manifolds (not shown) may be used to introduce oxidant gas into the oxidant zones of the multiple stages and withdraw oxygen-depleted oxidant gas from the oxidant zones of the multiple stages.

Other oxidant gas flow configurations are possible as alternatives to that described above. For example, the oxidant gas may flow counter-current to the reactive gas flow, cross-flow to the reactive gas flow, or in any other arrangement such that sufficient oxidant gas is provided to the oxidant zone side of the membranes.

Reactant gas may enter the multi-stage reactor system via manifold 27, a first portion may be withdrawn via line 29 and combined with another reactant gas (for example, steam) provided in line 31, and the combined gas may be introduced via reactant gas inlet line 33 into reactant side 1c of first stage 1. Additional portions of reactant gas may be withdrawn from manifold 27 via any of reactant interstage feed gas lines 35, 37, and 39 and introduced as reactant interstage feed gas into any of interstage reactant gas flow paths 1e, 3e, and 5e, respectively. Alternatively, the reactant interstage feed gas may be introduced directly into the reactant side of any stage and/or upstream of any of the catalysts 1d, 3d, 5d, and 7d. The reactant gas in manifold 27 may comprise one or more hydrocarbons and also may comprise any of the components water, carbon monoxide, carbon dioxide, and hydrogen. For example, the reactant gas in manifold 27 may be pre-reformed natural gas comprising methane, carbon monoxide, carbon dioxide, hydrogen, and water. The reactant gas provided via line 31 may be, for example, vaporized water (steam).

Additional reactant gas may be provided via manifold 41 from a source different than the source of the reactant gas in line 27 and the source of reactant gas provided via line 31. This additional reactant gas may be introduced via any of lines 29, 43, 45, and 47 into any of first stage 1, the interstage reactant gas in line 1e, the interstage reactant gas in line 3e, and the interstage gas entering last or $n^{th}$ stage 7. Alternatively, the additional reactant gas may be introduced upstream of any of catalysts 1d, 3d, 5d, and 7d. This additional reactant gas may be, for example, an oxygen-containing gas comprising carbon dioxide obtained from a downstream process that uses product gas from line 7e. The additional reactant gas may comprise unreacted offgas from a downstream process that uses product gas from line 7e and/or may comprise partially-reformed unreacted offgas from a downstream process that uses product gas from line 7e. Any number of additional stages may be utilized between stage 5 and last stage 7 as desired.

The gas flow rates in any of the lines described above may be regulated by control valves or other flow devices (not shown) known in the art. Alternatively or additionally, the temperatures of any of the gas streams may be controlled by heating and/or cooling (not shown) by methods known in the art. U.S. Pat. No. 6,010,614, incorporated herein by reference in its entirety, discloses temperature control in a ceramic membrane reactor.

Various combinations of reactant gas types including oxygen-containing gas may be introduced into the reactant sides of the modules in the staged membrane oxidation reactor system of FIG. 1. In one embodiment, for example, pre-reformed natural gas may be introduced into the reactor stages via manifold 27 and lines 29, 35, 37, and 39, and steam may be introduced via lines 31 and 33 into first stage 1. No additional reactant gas is provided via manifold 41 and lines 29, 43, 45, and 47 in this embodiment. In another exemplary embodiment, pre-reformed natural gas and steam may be introduced into the first stage via lines 31 and 33, and carbon dioxide-containing gas (for example, a recycle gas from a downstream process) may be introduced into the system via manifold 41 and any of lines 43, 45, and 47. The downstream process may be a hydrocarbon synthesis process (e.g., a Fischer-Tropsch process) or an oxygenated hydrocarbon synthesis process (e.g., an alcohol synthesis process). The downstream process may utilize synthesis gas produced by the staged oxidation reactor system of FIG. 1. Manifold 27 and lines 29, 35, 37, and 39 are not used in this embodiment. Other embodiments are possible in which combinations of reactant gas from different sources are introduced into the reactor stages. For example, pre-reformed natural gas may be provided to the staged reactor system via manifold 27 and lines 29, 35, 37, and 39, steam may be introduced into the system via line 31, and carbon dioxide-containing gas (for example, a recycle gas from a downstream process) may be introduced into the system via manifold 41 and any of lines 43, 45, and 47. In another example, a reactant gas comprising pre-reformed natural gas, a carbon dioxide-containing additional reactant gas, and steam are provided to the staged reactor system via manifold 27 and lines 29, 35, 37, and 39, and steam may be introduced into the system via line 31. Manifold 41 and lines 43, 45, and 47 are not used in this case.

Figure 2:
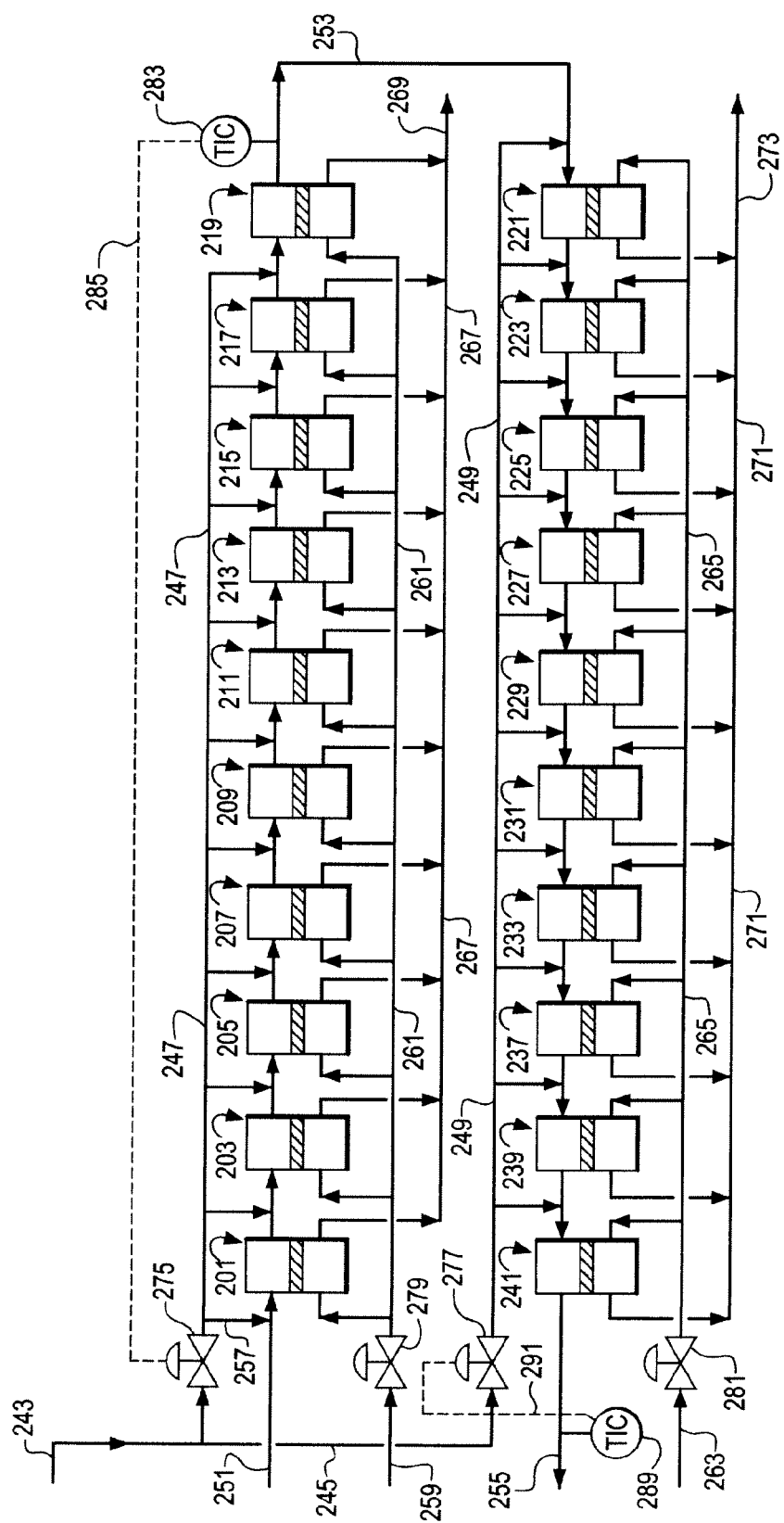
FIG. 2 is a schematic flow diagram of a specific configuration of the embodiment of FIG. 1 that can be operated according to disclosed embodiments.
Figure 3:
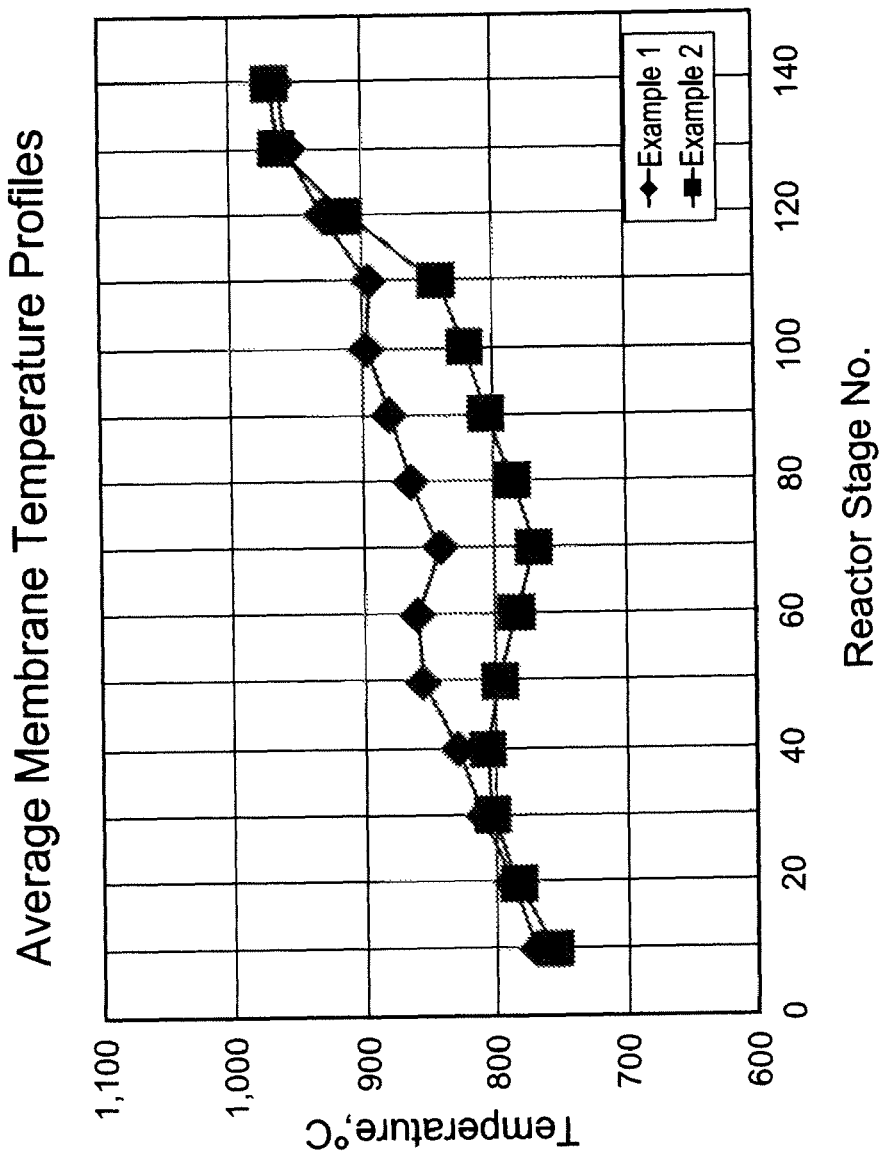
FIG. 3 is a plot of average membrane temperature vs. reactor stage number for Examples 1 and 2.
Figure 4:
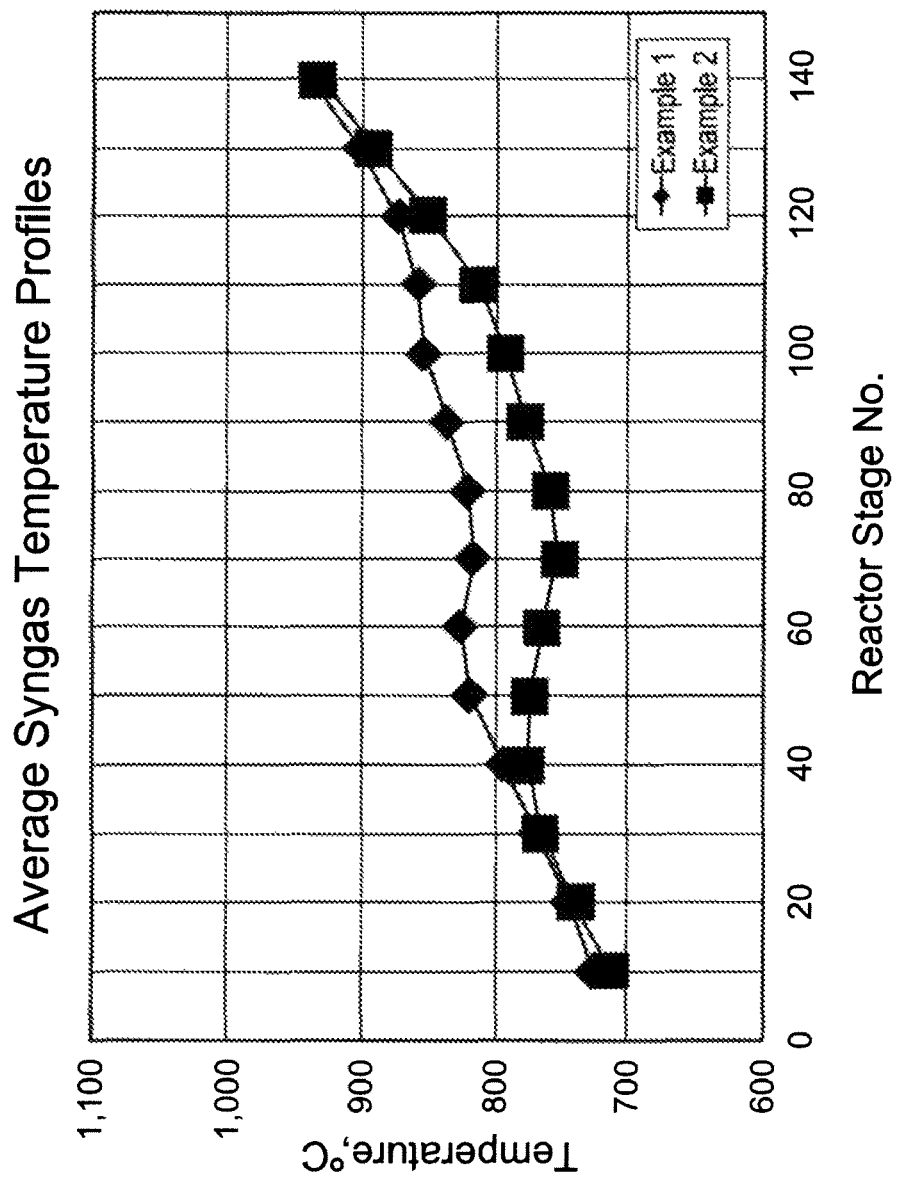
FIG. 4 is a plot of average syngas temperature vs. reactor stage number for Examples 1 and 2.
Figure 5:
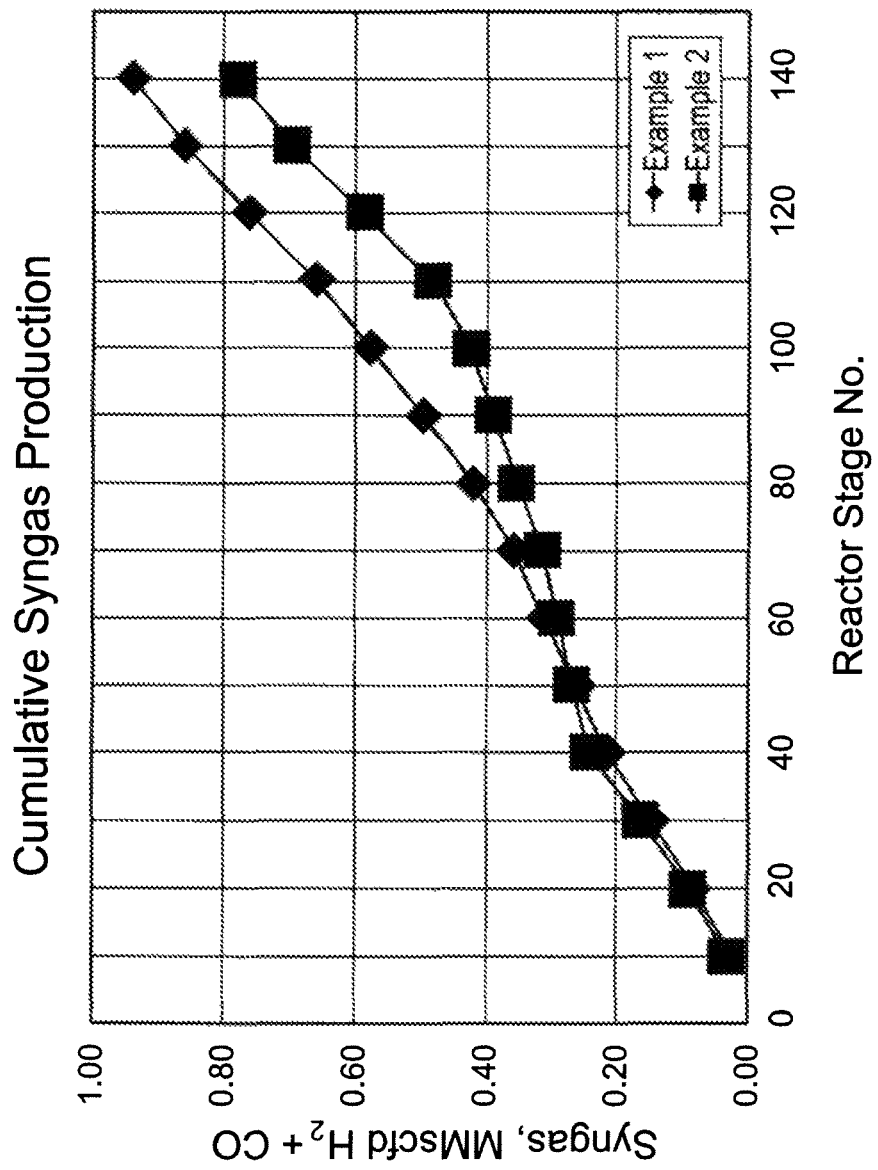
FIG. 5 is a plot of cumulative syngas production vs. reactor stage number for Examples 1 and 2.
Figure 6:
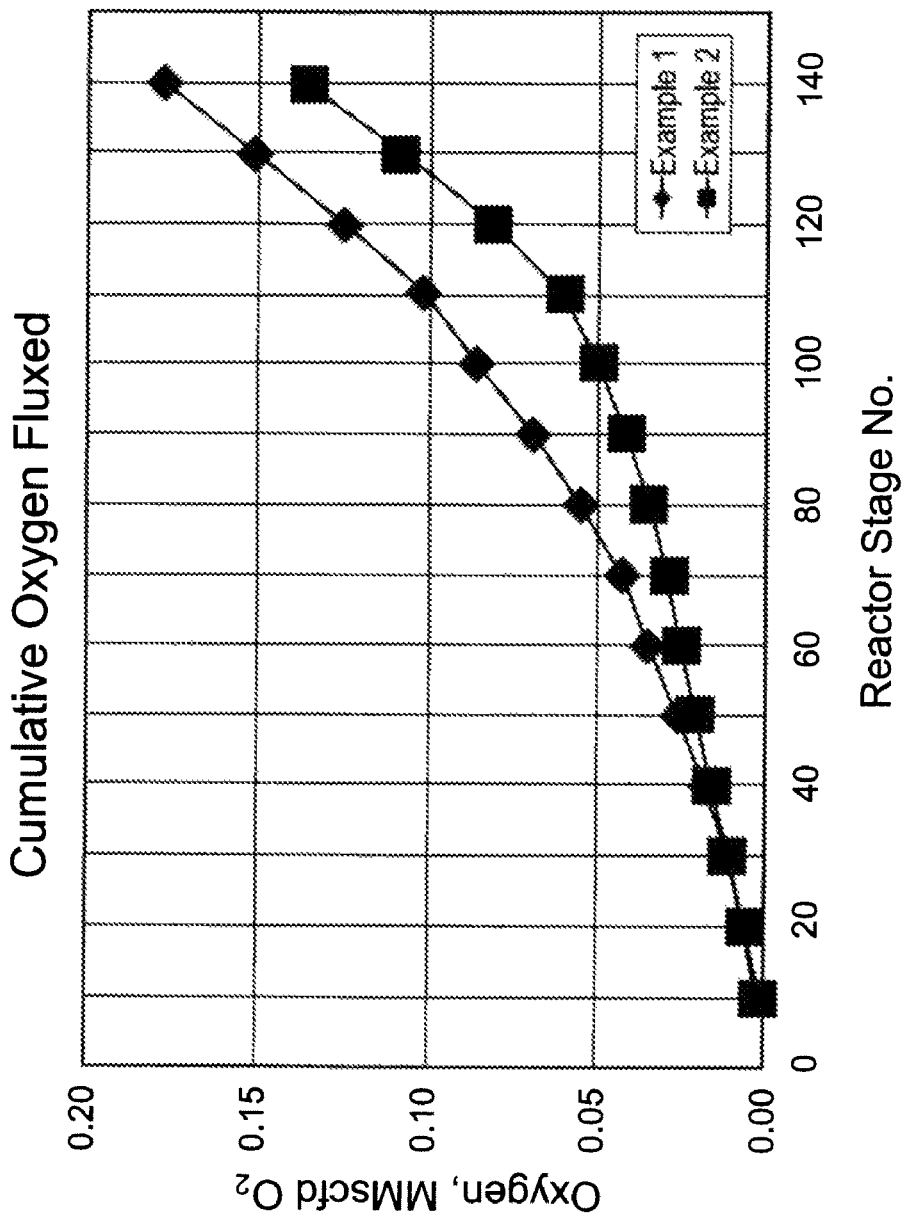
FIG. 6 is a plot of cumulative oxygen fluxed vs. reactor stage number for Examples 1 and 2.
Figure 7:
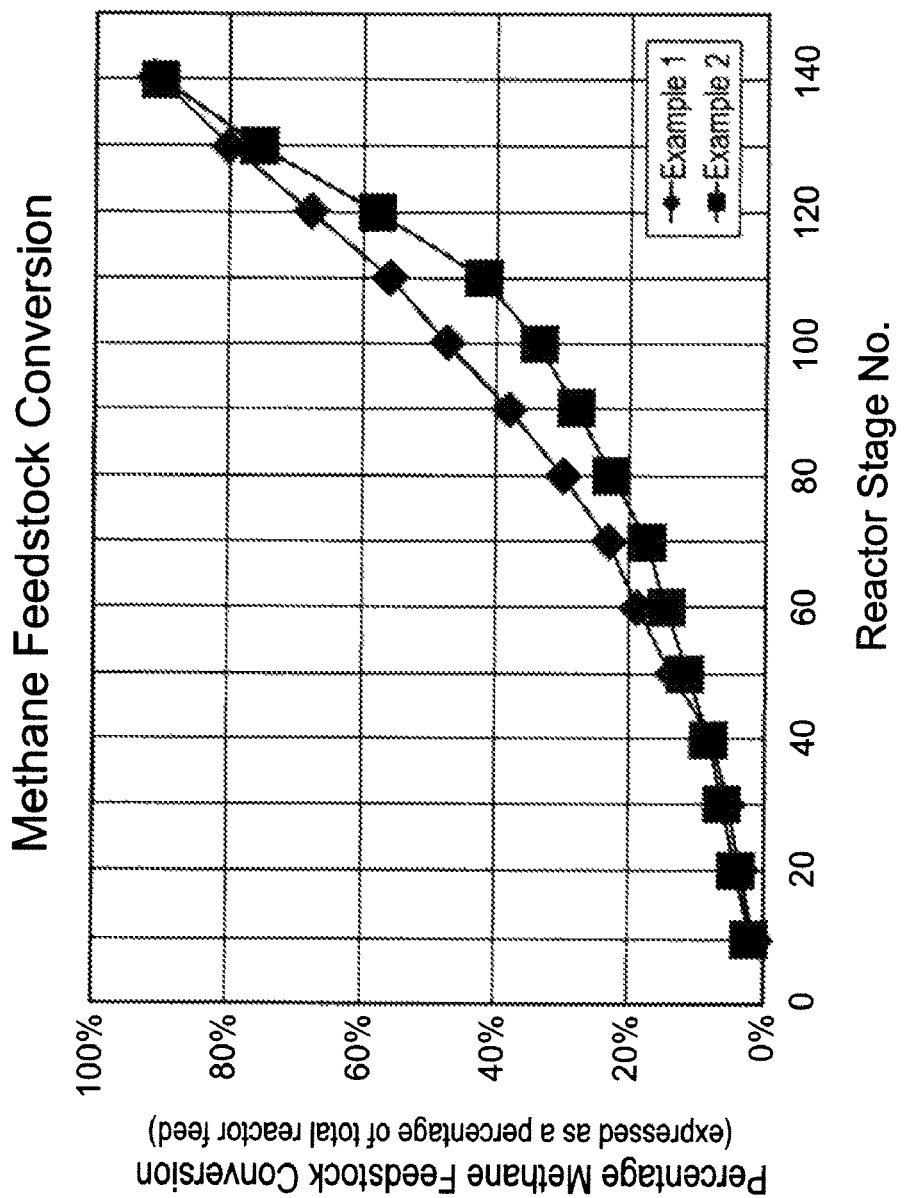
FIG. 7 is a plot of methane feedstock conversion vs. reactor stage number for Examples 1 and 2.
Figure 8:
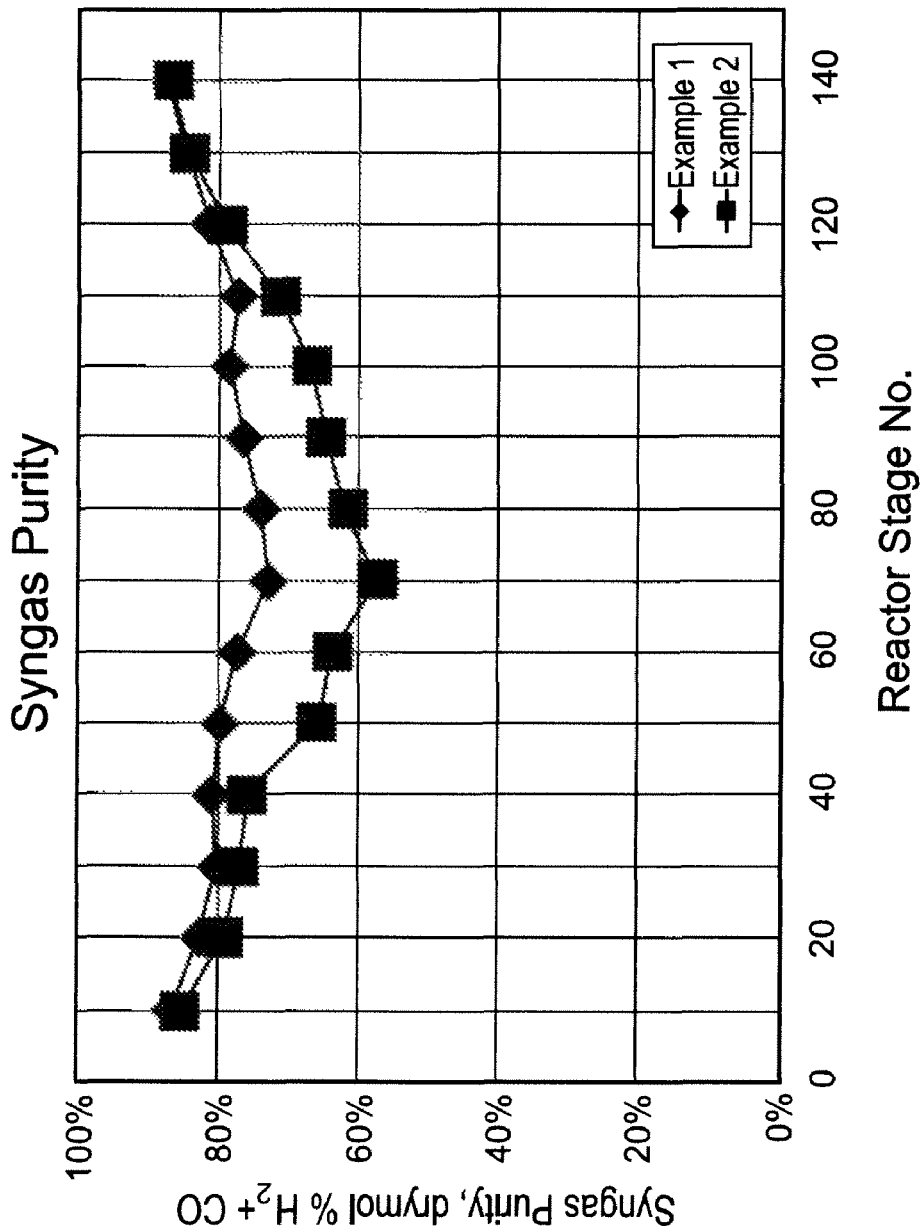
FIG. 8 is a plot of syngas purity vs. reactor stage number for Examples 1 and 2.

A selected embodiment of the system of FIG. 1 is illustrated in FIG. 2. In this exemplary embodiment, twenty reactor stages are used and are arranged for control purposes into two groups of ten stages each such that stages 201 through 219 are in a first group and stages 221 through 241 are in a second group. Pre-reformed natural gas may be introduced as a reactant feed gas via line. The reactant feed gas flows via primary manifold 245 and is split to flow through secondary manifolds 247 and 249. Steam is fed into first stage 201 via line 251.

The reactant feed gas flows through the reactant side of first stage 201, and interstage reactant gas flows between successive stages through stage 219. Interstage reactant gas from the first group of stages 201-219 flows via line 253 and then flows through the reactant sides of the successive stages in the second group of stages 221-241. Synthesis gas product flows from the system via line 255. The first group of stages 201-

219 may be installed in a single pressure vessel (not shown) wherein interstage reactant gas flows through open flow regions between stages and reactant gas from manifold 247 is injected into the respective flow regions between the stages.

The reactant feed gas in manifold 247 is divided into ten individual streams, and the first of these streams provides a reactant feed gas in line 257 that is mixed with the steam feed in line 251. The remaining nine reactant gas streams provide reactant interstage feed gas streams that are mixed with the corresponding interstage reactant gas streams between pairs of adjacent stages 201 through 219 as shown. Similarly, the reactant feed gas in manifold 249 is divided into ten individual streams to provide reactant interstage feed gas streams that are mixed with the corresponding interstage reactant gas streams between pairs of adjacent stages 221 through 241 as shown. The second group of stages 221-241 may be installed in a single pressure vessel (not shown) wherein interstage reactant gas flows through open flow regions between stages and reactant gas from manifold 249 is injected into the respective flow regions between the stages.

Manifold 247 may be designed to provide generally equal flow rates of reactive gas into stages 201 to 219; alternatively, the manifold may be designed to provide a different flow rate to each stage or groups of stages for reaction control purposes. Likewise, manifold 249 may be designed to provide generally equal flow rates of reactive gas into stages 221 to 241; alternatively, the manifold may be designed to provide a different flow rate to each stage or groups of stages for reaction control purposes.

A first preheated oxidant gas is introduced via line 259 into manifold 261 and is divided into ten portions to provide oxidant gas to the oxidant sides of stages 201 to 219 as shown. A second preheated oxidant gas is introduced via line 263 into manifold 265 and is divided into ten portions to provide oxidant gas to the oxidant sides of stages 221 to 241 as shown. The first and second preheated oxidant gas streams may be provided from a common upstream heater (not shown) and may be air heated to a temperature of 600 to 1150° C. Oxygen permeates through the membranes in the stages and reacts with the reactive components on the reactant sides of the stages as described earlier above. Oxygen-depleted non-permeate gas is withdrawn from stages 201-219 via lines feeding into manifold 267 and the gas is discharged via line 269. Similarly, oxygen-depleted non-permeate gas is withdrawn from stages 221-241 via lines feeding into manifold 271 and the gas is discharged via line 273. Heat and/or pressure energy may be recovered from the withdrawn non-permeate gas by any of the known methods described in the art.

Manifold 261 may be designed to provide generally equal flow rates of oxidant gas into stages 201 to 219; alternatively, the manifold may be designed to provide a different flow rate to each stage or groups of stages, for example, for reaction and/or temperature control purposes. Likewise, manifold 265 may be designed to provide generally equal flow rates of oxidant gas into stages 221 to 241; alternatively, the manifold may be designed to provide a different flow rate to each stage or groups of stages, for example, for reaction and/or temperature control purposes.

The temperatures in the stages and the reactions through the stages may be regulated by controlling any of the flow rates, compositions, and temperatures of any of the reactant and oxidant gases to the stages. Interstage heat exchangers may be used if desired to add or remove heat from any of the process streams. Temperature control may be accomplished, for example, by controlling the flow rates of reactant gas into manifolds 247 and 249 by control valves 275 and 277, respectively, and/or by controlling the flow rates of oxidant gas into manifolds 261 and 265 by control valves 279 and 281, respectively. Control of the reactant gases to the group of stages 201 to 219, for example, may be affected by temperature indicator/controller 283, which sends control signals via control line 285 to control valve 275. Likewise, control of the reactant gases to the group of stages 221 to 241 may be affected by temperature indicator/controller 289, which sends control signals via control line 291 to control valve 277.

In another example, temperature indicator/controller 283 may be located on oxygen-depleted non-permeate gas manifold 267 (not shown) and/or on oxygen-depleted non-permeate gas discharge line 269 (not shown). Likewise, temperature indicator/controller 289 may be located on oxygen-depleted non-permeate gas manifold 271 (not shown) and/or on oxygen-depleted non-permeate gas discharge line 273 (not shown). Control of oxidant gases to the group of stages 201 to 219 may be, for example, effected by control valve 279 located on the oxidant gas stream upstream of the stages (as shown), or located on the oxygen-depleted non-permeate gas stream downstream of the stages (not shown). Likewise, control of oxidant gases to the group of stages 221 to 241 may be, for example, effected by control valve 281 located on the oxidant stream upstream of the stages (as shown), or located on the oxygen-depleted non-permeate gas stream downstream of the stages (not shown).

In a typical embodiment, flow rates of oxidant gases fed to the stages may be varied to maintain target oxygen concentration in oxygen-depleted non-permeate gas withdrawn from the stages, for example through manifolds 267 and 271. For example, oxygen concentration may be monitored by an oxygen analyzer/indicator controller (not shown) located on manifold 267 and/or discharge 269, which may send control signals via a control line (not shown) to control valve 279. Likewise, oxygen concentration may be monitored by an oxygen analyzer/indicator controller (not shown) located on manifold 271 and/or discharge 273, which may send control signals via a control line (not shown) to control valve 281. Flow rate of permeated oxygen through the membranes may also be affected by the operating conditions (e.g. pressure and/or temperature) within the stage, particularly in the vicinity of the membrane permeation surface. In another embodiment, any or all feed gases (e.g. reactant feed gas, reactant interstage feed gas, and/or oxidant gas) to a stage or series of stages may be omitted from or bypassed around the stage or series of stages to affect temperatures and/or reactions.

The staged ITM reactor systems described above utilize reactant gas streams that may include any of oxygen, steam, hydrocarbons, pre-reformed mixtures of steam and hydrocarbon feed gas, hydrogen, carbon monoxide, carbon dioxide, and/or carbon dioxide containing gas. Reactions that occur in the staged reactor systems may include, for example, partial oxidation, complete oxidation, steam reforming, carbon dioxide reforming, water-gas shift, and combinations thereof to produce synthesis gas. Certain of these reactions are strongly exothermic and others are endothermic. Because ITM systems generally require a narrow operating temperature range, proper control of the exothermic and endothermic reactions is required. The embodiments described above provide for inherently stable operation in which the temperatures of the membrane system can be controlled within the required ranges.

The multiple reactant-staged membrane oxidation systems described above utilize at least two stages in series and may utilize up to 10 stages, up to 20 stages, up to 100 stages, or even greater than 100 stages in series depending on specific operating and product requirements. In the embodiment of FIG. 2, for example, the total flow of reactant interstage feed gas to each of the two groups of 10 stages (201-219 and 221-241) is separately controlled. Other embodiments similar to that of FIG. 2 are possible and may utilize a greater number of groups of 10 stages wherein the total flow and/or composition of the reactant interstage feed gas to each of the groups of 10 stages is separately controlled. In one embodiment described below in Examples 1 and 2, for example, there are 14 groups of 10 stages each in which the total flow and/or composition of the reactant interstage feed gas to each of the groups of 10 stages is controlled separately. A group of stages operated in this manner may include any number of stages.

The embodiments described herein are designed for the generation of synthesis gas, but may be applied to any oxidation or partial oxidation processes utilizing oxygen provided by permeation through ion transport membranes. When utilized for the generation of synthesis gas, the oxidant gas typically is preheated air, and steam is introduced into the reactant side of the first reactor stage. The reactant gas, for example pre-reformed natural gas, is divided into multiple streams with equal or unequal flow rates and introduced into the multiple reactor stages. In some embodiments, it is preferable that the reactant gas in each stage approach chemical equilibrium with respect to the steam reforming reaction, carbon dioxide reforming reaction, and/or the water gas shift reaction when catalysts for these reactions are provided in each stage. The reactant gas entering a stage, exiting a stage, and/or exiting optional catalyst (e.g. catalyst 1d in FIG. 1) thus may be at or near chemical equilibrium with respect to these reactions.

A flow of steam may be introduced into the reactant side of the first stage as shown in FIGS. 1 and 2 for the purpose of minimizing temperature excursions and enabling the process to operate at or near equilibrium in each of the stages. The term "temperature approach to equilibrium" for a given gas mixture is herein defined as the absolute value of the temperature difference between the actual temperature of the gas mixture and a calculated temperature at which the given reactants in the gas mixture would be at chemical equilibrium. Temperature approach to equilibrium may be expressed with respect to the gas mixture as a whole or with respect to a specific reaction or reactions (e.g., steam reforming, carbon dioxide reforming, and/or water-gas shift reactions) between specific reactants in the gas mixture. A typical temperature approach to equilibrium may be on the order of 0 to 100° F., and typically may be on the order of 0 to 20° F. When the catalyst is disposed on or adjacent the membranes, this approach will occur within the modules of the stage; when the catalyst is disposed following the membrane modules as shown in FIG. 1, the approach to equilibrium will occur at the outlet of the catalyst module. When catalyst is disposed preceding the membrane modules, the approach to equilibrium will occur preceding the modules.

The temperature of the reactant side of the modules in each stage (and therefore the temperature of the entire stage) may be controlled by varying the amount and distribution of the reactant gas provided to each stage or to groups of stages as illustrated in FIG. 2. The reactant side of each stage is generally reactant-rich (e.g., rich in oxidizable species) and the exothermic oxidation reactions which generate temperature rise are limited by the rates of oxygen permeation through the membrane. The endothermic reforming reactions which generate temperature drop are generally limited by both catalyst activity and by the amount of hydrocarbon, particularly methane, fed to each stage.

By conducting the overall reaction in multiple stages, sufficient catalyst may be provided within or between each of the stages such that the composition of the gas exiting a stage approaches equilibrium with respect to the reactions occurring in that stage prior to entering the next stage. This effectively tunes or regulates the catalyst activity such that endothermic reforming reactions and the associated temperature drop in each stage can be limited by the amount of hydrocarbon, particularly methane, fed to each stage as reactant interstage feed gas. Thus the hydrocarbon feed rate to each stage may be used to control the gas composition and temperature within and/or at the exit of the stage, and the composition and temperature of the gas can be made to approach equilibrium by controlling the hydrocarbon feed rate. A higher hydrocarbon feed rate will tend to cool the gas mixture via endothermic reforming, whereas a lower hydrocarbon feed rate will tend to yield higher temperatures by limiting the endothermic reforming that cools the reactant gas mixture.

If the oxidation reaction system is operated so that at least some of the reaction stages do not operate at or near equilibrium, varying the hydrocarbon feed rate to each stage also may be used to control the gas composition and temperature within and/or at the exit of the stage. A higher hydrocarbon feed rate and feed concentration will lead to increased rates of endothermic reforming reactions and thus tend to cool the gas mixture, whereas a lower hydrocarbon feed rate and feed concentration will lead to decreased rates of endothermic reforming reactions and thus tend to yield higher temperatures.

The membrane material used in the membrane oxidation reaction system must be operated within a specific temperature range as discussed above. The upper temperature limit is established based on criteria including the kinetic decomposition of the material, the mechanical creep of the membranes, the degree of iron volatilization in systems using iron-containing oxides, membrane stability in a synthesis gas environment in the presence of volatilized iron, potential catalyst life issues, and other criteria. The lower temperature limit is established based on the potential for carbon dioxide-induced membrane degradation, phase decomposition, and other criteria. The embodiments described herein provide methods for controlling the operation of an ITM oxidation reaction system to achieve inherently stable performance at off-design or alternate conditions by controlling the system within the critical ranges of gas composition and temperature required for stable and reliable membrane operation.

The terms "primary design operating conditions" or "primary design conditions" as used herein are defined as the set of process conditions associated with operation of an ITM oxidation reactor system at the primary design conditions at which the system operates essentially at steady-state conditions defined by the temperatures, pressures, flowrates, and compositions of the process streams. The design product composition and design product flow rate are provided when the system operates at the primary design conditions. The terms "alternate design operating conditions", "alternate operating conditions", or "off-design operating conditions" as used herein are defined as process conditions for operation of an ITM oxidation reactor system other than the primary design operating conditions.

The flux of oxygen through an ion transport membrane is a reasonably strong function of membrane temperature. The membrane operating temperature thus is a good control parameter to control the flux of oxygen, which in turn controls the syngas production capacity. A reduction in temperature yields a reduction in oxygen flux and production capacity; an increase in temperature yields an increase in oxygen flux and production capacity. Temperatures must be controlled properly, however, to minimize damage to the membrane material and to maximize membrane life.

The conversion of hydrocarbon (e.g., methane-containing) feedstock in an ITM oxidation reactor system (e.g., via the steam-methane reforming reaction) also is a function of temperature. Reduction in temperature yields a reduction in equilibrium methane conversion and an increase in un-reacted methane; an increase in temperature yields an increase in equilibrium methane conversion and a decrease in un-reacted methane.

The most attractive design point for an ITM syngas oxidation reactor system is for operation at the highest possible temperature within design constraints of the membrane material properties. The highest operating temperature yields the highest oxygen flux, associated syngas production capacity, and equilibrium conversion of methane to a valuable synthesis gas product.

The commercial operation of ITM oxidation reactor systems will require operation at off-design or alternate conditions, particularly turndown operation at reduced production capacity. Simple turndown may be achieved by reduction of operating temperature throughout the system, which yields reduction in oxygen flux. However, reduction in temperature also yields a reduction in equilibrium methane conversion and an increase in unreacted methane in the syngas product described by the term "methane slip". Reduced temperature throughout the system also will inhibit the production of carbon monoxide from carbon dioxide via the reverse shift reaction, and will increase the concentration of carbon dioxide in the product syngas. This may be desirable in some cases. This may be undesirable, however, when the syngas is consumed in a hydrocarbon synthesis process such as the Fisher-Tropsch process that requires certain levels of carbon monoxide in the syngas feed. In this case, operation of the ITM oxidation system at reduced temperature will simultaneously yield an undesirable reduction in conversion efficiency and syngas product quality because the desired syngas components hydrogen and carbon monoxide are diluted with carbon dioxide and unreacted methane.

The dilution of hydrogen and carbon monoxide in the syngas feed to a Fischer-Tropsch synthesis process, for example, may negatively impact the conversion of syngas to valuable liquid synthesis products (e.g. diesel, naptha, LPG), the selectivity of the liquid synthesis products, the unreacted gases (e.g. recycle gases, fuel gases), the general operation of the Fischer-Tropsch synthesis process, and the operation of an integrated synthesis gas generation and Fischer-Tropsch synthesis processes with recycle compression and fuel balance).

Design and off-design or alternate operating conditions can be characterized by how changes in operating conditions affect the design production capacity and design product quality of the syngas generated by the ITM oxidation reactor system. The term "production capacity" is defined as the combined molar flow rate of the hydrogen and carbon monoxide contained in the product synthesis gas stream. The term "product quality" is defined by any of the parameters (a) the mole fraction of hydrogen plus the mole fraction of carbon monoxide in the product gas stream, (b) the conversion of the one or more hydrocarbons in the reactant feed gas and the reactant interstage feed gas, and (c) the ratio $(x_{CO}+x_{H2})/(1-x_{H2O})$ where x is the mole fraction of the designated component.

The terms "feedstock conversion", "methane conversion", and "conversion" are defined as the amount, fraction, or percentage of hydrocarbon feedstock, for example methane (as used in the examples to follow), which is converted to non-hydrocarbon components of the syngas. The amount of hydrocarbon converted may be calculated by difference on a molar carbon basis. For example, when methane is the feedstock the amount of methane (or carbon) converted is equal to the amount of methane feed provided minus the amount of methane remaining after reactions have taken place. For general hydrocarbons, the amount of hydrocarbon converted may be calculated by difference on a molar carbon basis, for example the amount of carbon contained in hydrocarbon converted is equal to the amount of carbon contained in hydrocarbon feed provided minus the amount of carbon contained in hydrocarbon remaining after reactions have taken place.

In the case of staged reactor systems, feedstock conversion may be expressed as a fractional or percentage basis, using various bases. For example, the % feedstock conversion for a given stage of a reactor system may be defined as the amount of methane (or hydrocarbon) converted in that stage expressed as a percentage of the amount of the total methane (or hydrocarbon) provided to that stage. As another example, the % feedstock conversion up to a given stage in a multi-stage reactor system may be expressed as the amount of methane (or hydrocarbon) converted in all stages up to the given stage expressed as a percentage of the total amount of methane (or hydrocarbon) provided to all stages up to the given stage of the reactor system. In another example, the % feedstock conversion up to a given stage in the multistage reactor system may be expressed as the amount of methane (or hydrocarbon) converted in all stages up to that stage expressed as a percentage of the total amount of methane (or hydrocarbon) provided to all stages of the complete reactor system.

The term "design production capacity" is defined as the production capacity that occurs at design operating conditions and the term "design product quality" is defined as the product quality that occurs at design operating conditions.

The embodiments may be illustrated by the effects of stage operating temperature on production capacity and product quality in a multi-stage ITM oxidation reactor system operated to generate synthesis gas comprising hydrogen and carbon monoxide. For illustration purposes, consider a two-stage version of the system in FIG. 1 having representative first stage 1 and second stage 3. The exemplary process is operated by (a) introducing a reactant feed gas via line 33 into the reactant feed gas inlet of first stage 1, (b) withdrawing an interstage reactant gas from the interstage reactant gas outlet of first stage via line 1e, (c) combining the interstage reactant gas from stage 1 with a reactant interstage feed gas via line 35 and introducing the combined stream into the interstage feed gas inlet of second stage 3, and (e) withdrawing a product gas stream from the product gas outlet of second stage 3 via line 3e.

Nine operating case studies for this representative system were carried out using an ASPENPlus heat and material balance simulation program, including finite element simulation of the ITM membrane flux performance using fundamental transport models fit to lab and pilot plant performance data and simulation of heat and mass transfer performance using fundamental transport models. An operating design or base case was simulated as described in Example 1 below. In the primary design or base case, the first stage is operated at design characteristic temperature T1 and the second stage is operated at design characteristic temperature T2 to yield syngas production capacity PC and syngas product quality PQ. The syngas product exits the reactor system essentially at equilibrium.

The term "characteristic temperature" is defined as a selected temperature in a stage of a multi-stage ITM oxidation reactor system that characterizes the operating temperature of that stage. The characteristic temperature of the stage may be, for example, the temperature of the membrane (e.g., the membrane surface temperature), the temperature of the reactant gas as determined at any location in the reactant zone or at the reactant zone outlet, the average of reactant gas temperatures determined at two or more locations in the reactant zone including the reactant zone outlet, the temperature of the oxidant gas as determined at any location in the oxidant zone or at the oxidant zone outlet, the average of oxidant gas temperatures determined at two or more locations in the oxidant zone including the oxidant zone outlet, and the temperature of the intermediate or final reacted product gas from the stage.

The nine operating case studies are summarized in Table 1. In all cases the oxidation reactor system is operated at a defined reactant feed gas flow rate, composition, and pressure; a defined oxidant gas flow rate, composition, and pressure to the first stage (if the two stages are operated in series with respect to the oxidant gas flow); and a defined oxidant gas flow rate, composition, and pressure to each stage (if the two stages are operated independently with respect to the oxidant gas flow). The system utilizes any desired membrane material and membrane module design, and each stage utilizes any desired number of membrane modules. Cases 2-9 are arranged in the order shown for comparison purposes only and are not listed in a preferred order.

TABLE 1

Synthesis Gas Production Case Studies

| Case | Characteristic Temperature | | Representative Properties of Synthesis Gas Product | |
|---|---|---|---|---|
| | Stage 1 | Stage 2 | Production Capacity | Product Quality |
| 1 (Base) | T1 | T2 | PC | PQ |
| 2 | T1 | T2− | PC− | PQ− |
| 3 | T1 | T2+ | PC+ | PQ+ |
| 4 | T1− | T2 | PC− | PQ |
| 5 | T1− | T2− | PC− | PQ− |
| 6 | T1− | T2+ | PC− to PC+ | PQ+ |
| 7 | T1+ | T2 | PC+ | PQ |
| 8 | T1+ | T2− | PC− to PC+ | PQ− |
| 9 | T1+ | T2+ | PC+ | PQ+ |

In the base case (Case 1), the system is operated at design operating conditions having a characteristic temperature T1 of the first stage (or set of stages) and a characteristic temperature T2 of the second stage (or set of stages) to yield design production capacity PC and design product quality PQ. The characteristic temperatures T1 and T2 may be changed from the base case design operation for operation at the off-design or alternate conditions described below for Cases 2-9.

Case 2 The characteristic temperature of stage 1 is maintained at T1 and the characteristic temperature of stage 2 is reduced to T2−. As a result, both the production capacity and the product quality decrease to PC− and PQ−, respectively. Operation at these conditions may yield longer operating life of the membranes in the second stage.

Case 3 The characteristic temperature of stage 1 is maintained at T1 and the characteristic temperature of stage 2 is increased to T2+. As a result, both the production capacity and the product quality increase to PC+ and PQ+, respectively. This operating scenario may represent a short-term, high-capacity, high-quality syngas production campaign; the operating life of the membranes in the second stage may be sacrificed.

Case 4 The characteristic temperature of stage 1 is reduced to T1− and the characteristic temperature of stage 2 is maintained at the design value of T2. As a result, the production capacity decreases to PC− and the product quality is maintained at the design value of PQ. This case illustrates a typical turndown operation in which a reduced flow of syngas at design product quality is required.

Case 5 The characteristic temperatures of stage 1 and stage 2 are reduced to T1− and T2−, respectively. As a result, both the production capacity and the product quality decrease to PC− and PQ−, respectively. The significant turndown operation in this scenario may be desirable for potentially longer operating life of the membranes in both stages.

Case 6 The characteristic temperature of stage 1 is reduced to T1− and the characteristic temperature of stage 2 is increased to T2+. As a result, the production capacity may either decrease to PC− or increase to PC+ depending on the actual reactor system design and the actual values of T1− and T2+. The product quality increases to PQ+. Operation in this case may represent a short-term, high-quality syngas production campaign; operating life of the membranes in the second stage may be sacrificed.

Case 7 The characteristic temperature of stage 1 is increased to T1+ and the characteristic temperature of stage 2 is maintained at the design value of T2. As a result, the production capacity increases to PC+ and the product quality is maintained at the design value of PQ. This case illustrates, for example, a short-term, high-capacity syngas production campaign; operating life of the membranes in the first stage may be sacrificed.

Case 8 The characteristic temperature of stage 1 is increased to T1+ and the characteristic temperature of stage 2 is decreased to T2−. As a result, the production capacity will either decrease to PC− or increase to PC+ depending on the actual reactor system design and the actual values of T1− and T2+. The product quality decreases to PQ−. This scenario illustrates a short-term, high-capacity syngas production campaign; the operating life of the membranes in the first stage may be sacrificed and the operating life of the membranes in the second stage may be extended.

Case 9 The characteristic temperatures of stage 1 and stage 2 are increased to T1+ and T2+, respectively. This case illustrates short-term, high-capacity syngas production campaign; operating life of the membranes in both stages may be sacrificed.

Temperature control for the process operations illustrated above may be accomplished by control of the appropriate reactant feed gas and reactant interstage feed gas flow rates. The set points for the appropriate flow controllers may be, for example, any of the temperatures described above, namely, the temperatures of the membranes, the reactant gas streams, the oxidant gas streams, and the product streams.

When the operating scenarios for the exemplary two-stage system described above are applied to multi-stage membrane systems having up to 100 or more stages, the temperature set points need not be increased or decreased to every module or stage, or every group of stages, along the series of reactor stages. For example, temperature set points on certain stages or groups of stages may be increased or decreased from the base case operation while the set points on other stages or groups of stages may be maintained as in the base case operation.

The following Examples illustrate the embodiments described above but do not limit the embodiments to any of the specific details described therein.

EXAMPLE 1

A heat and material balance for the staged membrane oxidation reactor system of the type described in U.S. 2008/0302013 A1 was simulated at a set of conditions to provide a syngas product at a selected primary design production rate and product quality. The simulation method used was the same as described above for the nine comparative cases summarized in Table 1.

The reactor system consists of 140 membrane oxidation stages in which 14 sets of 10 stages each are operated as described in US 2008/0302013 A1. The flow of the reactant interstage feed gas streams to each group of stages is divided equally among the 10 stages in each set. The oxidant gas is air that is preheated to 871° C. and provided to each stage at flow rates sufficient to yield the fluxes shown in Table 2A. Temperatures and temperature set points are measured and set to yield the operating conditions summarized in Tables 2A, 2B, and 2C. "sccm/cm$^2$" means standard cubic centimeters per square centimeter, where standard conditions are 0° C. and 1 atm. "MMscfd" means million standard cubic feet per day, where standard conditions are 15.6° C. (60° F.) and 1 atm.

In the operation, 4.83 kgmol/hr steam and 0.16 kgmol/hr hydrogen are preheated to 740° C. and introduced to the first reaction stage of the first group of 10 stages. Natural gas at 16.10 kgmol/hr, 0.32 kgmol/hr hydrogen, and 8.05 kgmol/hr steam are mixed and preheated to 482° C., and the heated mixture is pre-reformed in an adiabatic pre-reformer reactor and exits the reactor at 439° C. This mixture is distributed to the 140 membrane oxidation stages as reactant gas and reactant interstage feed gas wherein the gas streams are introduced into each group of 10 stages as illustrated in FIG. 2 for stages 201-219 or 221-241. The total flow of reactant gas is controlled to each set of 10 stages.

A flow of 6.81 kgmol/hr hydrogen is divided and introduced at equal flow rates to the first 40 stages to suppress carbon formation. A flow of 7.19 kgmol/hr carbon dioxide is divided and introduced at equal flow rates to the last 70 stages in order to yield a product syngas containing 86.8 mol % H$_2$+CO and a H$_2$/CO molar ratio of 2.0. A total of 8.86 kgmol/hr oxygen permeates the membranes and reacts with the steam and pre-reformed feed gas on the cathode side of the modules to yield the synthesis gas components H$_2$ and CO.

Syngas product at a flow rate of 71.2 kgmol/hr is withdrawn from stage 140 of the reactor system at 31.9 bara and 950° C. with the composition given in Table 2 below.

TABLE 2

Product Gas Composition for Example 1

|  | Wet Mol % | Dry Mol % |
|---|---|---|
| Hydrogen | 43.7 | 57.8 |
| Methane | 2.0 | 2.6 |
| Carbon Dioxide | 8.0 | 10.6 |
| Carbon Monoxide | 21.9 | 29.0 |
| Water | 24.4 | 0.0 |

A detailed heat and material balance data for each set of 10 stages and profiles of average membrane temperature, average syngas temperature, syngas production, oxygen fluxed, methane feedstock conversion, and syngas purity are provided in Tables 2A, 2B, and 2C. Plots showing average membrane temperature profiles, average syngas temperature profiles, cumulative syngas production, cumulative oxygen fluxed, methane feedstock conversion, and syngas purity as a function of reactor stage number are given in FIGS. 3 through 8, respectively.

TABLE 2A

Operating Conditions Summary for Example 1

| | Group Stage Numbers | | | | | | | | | | | | | |
|---|---|---|---|---|---|---|---|---|---|---|---|---|---|---|
| | 1-10 | 11-20 | 21-30 | 31-40 | 41-50 | 51-60 | 61-70 | 71-80 | 81-90 | 91-100 | 101-110 | 111-120 | 121-130 | 131-140 |
| Number of Wafers | 20 | 20 | 20 | 20 | 30 | 30 | 30 | 40 | 40 | 40 | 40 | 40 | 40 | 40 |
| Average Membrane Temperature, ° C. | 770 | 787 | 808 | 829 | 855 | 859 | 841 | 863 | 879 | 896 | 893 | 929 | 955 | 964 |
| Average Syngas Temperature, ° C. | 725 | 742 | 767 | 792 | 818 | 826 | 816 | 819 | 835 | 853 | 857 | 872 | 900 | 934 |
| Average O$_2$ Flux, sccm/cm$^2$ | 3.6 | 6.0 | 7.8 | 9.9 | 9.3 | 9.6 | 8.1 | 9.9 | 11.3 | 12.9 | 12.5 | 18.8 | 20.8 | 20.9 |
| Oxygen Fluxed, kgmol/hr | 0.11 | 0.19 | 0.24 | 0.31 | 0.44 | 0.45 | 0.38 | 0.62 | 0.71 | 0.81 | 0.79 | 1.18 | 1.31 | 1.32 |
| Cumulative O$_2$ Fluxed, kgmol/hr | 0.11 | 0.30 | 0.54 | 0.85 | 1.30 | 1.75 | 2.13 | 2.75 | 3.46 | 4.27 | 5.05 | 6.24 | 7.54 | 8.86 |
| Cumulative O$_2$ Fluxed, MMScfd | 0.00 | 0.01 | 0.01 | 0.02 | 0.03 | 0.04 | 0.04 | 0.06 | 0.07 | 0.09 | 0.10 | 0.13 | 0.15 | 0.18 |
| Syngas Produced, kgmol/hr H$_2$ + | 1.6 | 2.5 | 3.2 | 3.3 | 2.4 | 2.5 | 2.2 | 3.2 | 3.7 | 4.2 | 4.0 | 4.9 | 5.0 | 4.0 |

TABLE 2A-continued

Operating Conditions Summary for Example 1

| | Group Stage Numbers | | | | | | | | | | | | | |
|---|---|---|---|---|---|---|---|---|---|---|---|---|---|
| | 1-10 | 11-20 | 21-30 | 31-40 | 41-50 | 51-60 | 61-70 | 71-80 | 81-90 | 91-100 | 101-110 | 111-120 | 121-130 | 131-140 |
| CO Cumulative Syngas Produced, kgmol/hr $H_2$ + CO | 1.6 | 4.2 | 7.4 | 10.6 | 13.0 | 15.5 | 17.7 | 21.0 | 24.7 | 28.9 | 32.9 | 37.8 | 42.7 | 46.7 |
| Cumulative Syngas Produced, MMscfd $H_2$ + CO | 0.03 | 0.08 | 0.15 | 0.21 | 0.26 | 0.31 | 0.36 | 0.42 | 0.50 | 0.58 | 0.66 | 0.76 | 0.86 | 0.94 |

TABLE 2B

Feed Stream Properties for Example 1

| | Initial Feed | Fresh Feed to Stage Numbers | | | | | | | | | | | | | |
|---|---|---|---|---|---|---|---|---|---|---|---|---|---|---|---|
| | | 1-10 | 11-20 | 21-30 | 31-40 | 41-50 | 51-60 | 61-70 | 71-80 | 81-90 | 91-100 | 101-110 | 111-120 | 121-130 | 131-140 |
| Total Flow, kgmol/hr | 5.0 | 1.1 | 2.9 | 4.2 | 3.7 | 2.1 | 2.8 | 3.9 | 2.6 | 2.1 | 2.3 | 4.4 | 1.8 | 2.1 | 2.1 |
| Methane, mol % | 0.0 | 27.0 | 27.0 | 27.0 | 27.0 | 63.0 | 63.0 | 63.0 | 57.9 | 57.9 | 57.9 | 57.9 | 0.0 | 0.0 | 0.0 |
| Hydrogen, mol % | 3.2 | 59.7 | 59.7 | 59.7 | 59.7 | 6.0 | 6.0 | 6.0 | 5.5 | 5.5 | 5.5 | 5.5 | 0.0 | 0.0 | 0.0 |
| Carbon Monoxide, mol % | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| Carbon Dioxide, mol % | 0.0 | 0.5 | 0.5 | 0.5 | 0.5 | 1.2 | 1.2 | 1.2 | 9.2 | 9.2 | 9.2 | 9.2 | 100.0 | 100.0 | 100.0 |
| Water, mol % | 96.8 | 12.8 | 12.8 | 12.8 | 12.8 | 29.8 | 29.8 | 29.8 | 27.3 | 27.3 | 27.3 | 27.3 | 0.0 | 0.0% | 0.0 |

TABLE 2C

Operating Conditions and Syngas Stage Effluent Stream Properties for Example 1

| | Syngas Effluent from Stage Number | | | | | | | | | | | | | |
|---|---|---|---|---|---|---|---|---|---|---|---|---|---|---|
| | 10 | 20 | 30 | 40 | 50 | 60 | 70 | 80 | 90 | 100 | 110 | 120 | 130 | 140 |
| Total Flow, kgmol/hr | 6.6 | 10.1 | 14.9 | 19.4 | 23.1 | 27.5 | 32.8 | 37.6 | 42.2 | 47.3 | 54.4 | 59.9 | 65.8 | 71.2 |
| Temperature, ° C. | 733 | 756 | 776 | 802 | 818 | 820 | 806 | 819 | 837 | 853 | 850 | 877 | 908 | 950 |
| Pressure, bara | 34.2 | 34.0 | 33.8 | 33.6 | 33.5 | 33.3 | 33.1 | 33.0 | 32.8 | 32.6 | 32.4 | 32.3 | 32.1 | 31.9 |
| Methane, mol % | 0.6 | 5.2 | 9.3 | 10.1 | 10.8 | 12.5 | 15.9 | 15.0 | 13.3 | 11.7 | 12.4 | 8.3 | 4.6 | 2.0 |
| Hydrogen, mol % | 24.1 | 39.1 | 46.3 | 50.5 | 50.4 | 49.3 | 46.8 | 46.9 | 47.9 | 48.7 | 47.5 | 46.8 | 45.6 | 43.7 |
| Carbon Monoxide, mol % | 0.8 | 2.2 | 3.1 | 4.1 | 5.9 | 7.0 | 7.2 | 8.9 | 10.6 | 12.3 | 12.9 | 16.3 | 19.4 | 21.9 |
| Carbon Dioxide, mol % | 3.2 | 3.5 | 2.9 | 2.7 | 3.3 | 3.8 | 4.1 | 4.5 | 4.7 | 4.9 | 5.2 | 6.3 | 7.2 | 8.0 |
| Water, mol % | 71.3 | 50.0 | 38.5 | 32.6 | 29.6 | 27.3 | 25.9 | 24.6 | 23.4 | 22.4 | 22.0 | 22.4 | 23.2 | 24.4 |
| Syngas Purity, dry mol % $H_2$ + CO | 86.7 | 82.6 | 80.2 | 81.0 | 79.9 | 77.6 | 73.0 | 74.0 | 76.4 | 78.6 | 77.4 | 81.3 | 84.5 | 86.8 |
| Cumulative Methane Feed to Reactor, kgmol/hr | 0.3 | 1.1 | 2.2 | 3.2 | 4.5 | 6.3 | 8.8 | 10.3 | 11.5 | 12.8 | 15.4 | 15.4 | 15.4 | 15.4 |
| Methane Conversion, % of cumulative methane feed | 87.1 | 51.3 | 37.7 | 39.1 | 45.0 | 45.3 | 40.4 | 45.0 | 51.2 | 56.9 | 56.1 | 67.9 | 80.2 | 90.9 |
| Methane Conversion, % of total methane feed | 1.7 | 3.6 | 5.5 | 8.2 | 13.3 | 18.5 | 23.0 | 30.0 | 38.2 | 47.4 | 56.1 | 67.9 | 80.2 | 90.9 |

EXAMPLE 2

A heat and material balance for the staged membrane oxidation reactor system of Example 1 was carried out using the same simulation method but at off-design or alternate operating conditions relative to the primary design operating conditions of Example 1. The off-design or alternate operating conditions of Example 2 yield reduced syngas production capacity at essentially the same syngas purity and methane feedstock conversion relative to Example 1.

The reactor system consists of 140 membrane oxidation stages in which 14 sets of 10 stages each are operated by controlling the temperatures and gas flow rates to each of the groups. The flow of the reactant interstage feed gas streams to each group of stages is divided equally among the 10 stages in the group. The oxidant gas is air that is preheated to 871° C. and provided to each stage at flow rates sufficient to yield the fluxes shown in Table 3A. Temperatures and temperature set points are measured and set to yield the operating conditions summarized in Tables 3A, 3B, and 3C.

In the operation, 3.57 kgmol/hr steam and 0.12 kgmol/hr hydrogen are preheated to 736° C. and introduced to the first reaction stage of the first group of 10 stages. Natural gas at 11.91 kgmol/hr, 0.24 kgmol/hr hydrogen, and 5.95 kgmol/hr steam are mixed and preheated to 482° C., and the heated mixture is pre-reformed in an adiabatic pre-reformer reactor and exits the reactor at 439° C. This mixture is distributed to the 140 membrane oxidation stages as reactant gas and reactant interstage feed gas wherein the gas streams are introduced into each group of 10 stages as illustrated, for example, in FIG. 2 for stages 201-219 or 221-241. The total flow of reactant gas is controlled to each set of 10 stages.

A flow of 9.39 kgmol/hr hydrogen is divided and introduced at equal flow rates to the first 40 stages to suppress carbon formation. A flow of 7.58 kgmol/hr carbon dioxide is divided and introduced at equal flow rates to the last 100 stages in order to yield a product syngas containing 86.7 mol % $H_2$+CO and a $H_2$/CO molar ratio of 2.0. A total of 6.73 kgmol/hr oxygen permeates the membranes and reacts with the steam and pre-reformed feed gas on the cathode side of the modules to yield the synthesis gas components $H_2$ and CO.

Syngas product at a flow rate of 59.3 kgmol/hr is withdrawn from stage 140 of the reactor system at 31.9 bara and 950° C. with the composition given in Table 3 below.

TABLE 3

Product Gas Composition for Example 2

|  | Wet Mol % | Dry Mol % |
| --- | --- | --- |
| Hydrogen | 43.6% | 57.8% |
| Methane | 1.9% | 2.5% |
| Carbon Dioxide | 8.1% | 10.7% |
| Carbon Monoxide | 21.8% | 28.9% |
| Water | 24.6% | 0.0 |

A detailed heat and material balance data for each set of 10 stages and profiles of average membrane temperature, average syngas temperature, syngas production, oxygen fluxed, methane feedstock conversion, and syngas purity are provided in Tables 3A, 3B, and 3C. Plots showing average membrane temperature profiles, average syngas temperature profiles, cumulative syngas production, cumulative oxygen fluxed, methane feedstock conversion, and syngas purity as a function of reactor stage number are given in FIGS. 3 through 8, respectively.

TABLE 3A

Operating Conditions Summary for Example 2

| | Group Stage Numbers | | | | | | | | | | | | | |
| --- | --- | --- | --- | --- | --- | --- | --- | --- | --- | --- | --- | --- | --- | --- |
| | 1-10 | 11-20 | 21-30 | 31-40 | 41-50 | 51-60 | 61-70 | 71-80 | 81-90 | 91-100 | 101-110 | 111-120 | 121-130 | 131-140 |
| Number of Wafers | 20 | 20 | 20 | 20 | 30 | 30 | 30 | 40 | 40 | 40 | 40 | 40 | 40 | 40 |
| Average Membrane Temperature, ° C. | 758 | 785 | 804 | 806 | 797 | 784 | 770 | 786 | 805 | 821 | 842 | 915 | 962 | 967 |
| Average Syngas Temperature, ° C. | 713 | 740 | 764 | 776 | 774 | 764 | 752 | 759 | 777 | 792 | 812 | 849 | 891 | 931 |
| Average $O_2$ Flux, sccm/cm² | 3.4 | 6.1 | 7.7 | 8.3 | 5.4 | 4.5 | 3.9 | 4.6 | 5.5 | 6.4 | 7.9 | 17.0 | 21.5 | 21.4 |
| $O_2$ Fluxed, kgmol/hr | 0.11 | 0.19 | 0.24 | 0.26 | 0.25 | 0.21 | 0.18 | 0.29 | 0.34 | 0.40 | 0.49 | 1.07 | 1.35 | 1.34 |
| Cumulative $O_2$ Fluxed, kgmol/hr | 0.11 | 0.30 | 0.54 | 0.80 | 1.05 | 1.27 | 1.45 | 1.73 | 2.08 | 2.48 | 2.97 | 4.04 | 5.39 | 6.73 |
| Cumulative $O_2$ Fluxed, MMScfd | 0.00 | 0.01 | 0.01 | 0.02 | 0.02 | 0.03 | 0.03 | 0.03 | 0.04 | 0.05 | 0.06 | 0.08 | 0.11 | 0.14 |
| Syngas Produced, kgmol/hr $H_2$ + CO | 1.6 | 2.9 | 3.6 | 4.0 | 1.3 | 1.1 | 1.1 | 2.0 | 1.8 | 1.8 | 2.8 | 5.3 | 5.4 | 4.0 |
| Cumulative $H_2$ + CO Produced, kgmol/hr | 1.6 | 4.5 | 8.1 | 12.2 | 13.4 | 14.6 | 15.6 | 17.6 | 19.4 | 21.2 | 24.0 | 29.3 | 34.7 | 38.7 |
| Cumulative $H_2$ + CO Produced, MMscfd | 0.03 | 0.09 | 0.16 | 0.24 | 0.27 | 0.29 | 0.31 | 0.35 | 0.39 | 0.43 | 0.48 | 0.59 | 0.70 | 0.78 |

TABLE 3B

Feed Stream Properties for Example 2

| | Initial Feed | Fresh Feed to Stage Numbers | | | | | | | | | | | | |
|---|---|---|---|---|---|---|---|---|---|---|---|---|---|---|
| | | 1-10 | 11-20 | 21-30 | 31-40 | 41-50 | 51-60 | 61-70 | 71-80 | 81-90 | 91-100 | 101-110 | 111-120 | 121-130 | 131-140 |
| Total Flow, kgmol/hr | 3.7 | 1.2 | 3.9 | 5.3 | 6.0 | 5.2 | 2.6 | 5.2 | 0.0 | 0.5 | 1.0 | 0.0 | 0.0 | 1.5 | 2.3 |
| Methane, mol % | 0.0 | 27.0 | 27.0 | 27.0 | 27.0 | 54.8 | 54.8 | 54.8 | 0.0 | 0.0 | 0.0 | 0.0 | 0.0 | 0.0 | 0.0 |
| $H_2$, mol % | 3.2 | 59.7 | 59.7 | 59.7 | 59.7 | 5.2 | 5.2 | 5.2 | 0.0 | 0.0 | 0.0 | 0.0 | 0.0 | 0.0 | 0.0 |
| CO, mol % | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| $CO_2$, mol % | 0.0 | 0.5 | 0.5 | 0.5 | 0.5 | 14.1 | 14.1 | 14.1 | 100.0 | 100.0 | 100.0 | 0.0 | 100.0 | 100.0 | 100.0 |
| Water, mol % | 96.8 | 12.8 | 12.8 | 12.8 | 12.8 | 25.9 | 25.9 | 25.9 | 0.0 | 0.0 | 0.0 | 0.0 | 0.0 | 0.0 | 0.0 |

TABLE 3C

Operating Conditions and Syngas Stage Effluent Stream Properties for Example 2

| | Syngas Effluent from Stage Number | | | | | | | | | | | | | |
|---|---|---|---|---|---|---|---|---|---|---|---|---|---|---|
| | 10 | 20 | 30 | 40 | 50 | 60 | 70 | 80 | 90 | 100 | 110 | 120 | 130 | 140 |
| Total Flow, kgmol/hr | 5.4 | 9.8 | 15.5 | 22.0 | 28.0 | 31.3 | 37.0 | 38.3 | 40.0 | 42.4 | 44.2 | 48.0 | 53.6 | 59.3 |
| Temperature, °C. | 728 | 758 | 773 | 782 | 763 | 761 | 744 | 765 | 782 | 795 | 818 | 860 | 902 | 950 |
| Pressure, bara | 34.2 | 34.0 | 33.8 | 33.6 | 33.5 | 33.3 | 33.1 | 33.0 | 32.8 | 32.6 | 32.4 | 32.3 | 32.1 | 31.9 |
| Methane, mol % | 1.7 | 9.2 | 13.5 | 15.8 | 21.3 | 22.4 | 25.8 | 23.3 | 20.8 | 18.0 | 15.2 | 10.1 | 5.3 | 1.9 |
| Hydrogen, mol % | 28.7 | 43.8 | 49.4 | 52.2 | 43.6 | 41.4 | 36.8 | 39.3 | 40.2 | 39.7 | 42.2 | 46.1 | 46.2 | 43.6 |
| CO, mol % | 1.1 | 2.4 | 2.8 | 3.0 | 4.4 | 5.2 | 5.4 | 6.7 | 8.3 | 10.4 | 12.0 | 14.9 | 18.6 | 21.8 |
| $CO_2$, mol % | 3.5 | 2.8 | 2.1 | 1.7 | 3.3 | 4.0 | 5.1 | 5.1 | 5.7 | 6.9 | 6.6 | 6.2 | 6.9 | 8.1 |
| Water, mol % | 65.1 | 41.8 | 32.1 | 27.3 | 27.4 | 27.0 | 26.9 | 25.6 | 25.0 | 25.0 | 24.0 | 22.7 | 23.0 | 24.6 |
| Syngas Purity, dry mol % $H_2$ + CO | 85.3 | 79.4 | 77.0 | 75.9 | 66.1 | 63.8 | 57.8 | 61.8 | 64.7 | 66.8 | 71.4 | 78.9 | 84.2 | 86.7 |
| Cumulative $CH_4$ Feed to Reactor, kgmol/hr | 0.3 | 1.4 | 2.8 | 4.4 | 7.3 | 8.7 | 11.5 | 11.5 | 11.5 | 11.5 | 11.5 | 11.5 | 11.5 | 11.5 |
| $CH_4$ Conversion, % of cumulative methane feed | 72.7 | 35.0 | 25.5 | 21.5 | 18.3 | 19.4 | 17.2 | 22.7 | 28.0 | 33.7 | 41.9 | 58.0 | 75.6 | 90.2 |
| $CH_4$ Conversion, % of total methane feed | 2.1 | 4.2 | 6.2 | 8.3 | 11.6 | 14.6 | 17.2 | 22.7 | 28.0 | 33.7 | 41.9 | 58.0 | 75.6 | 90.2 |

The operating features of Examples 1 and 2 are compared below.

Total oxygen fluxed in Example 2 (6.73 kgmol/hr) is 76% of that fluxed in Example 1 (8.86 kgmol/hr).

Total methane feed in Example 2 (11.5 kgmol/hr) is 75% of that in Example 1 (15.4 kgmol/hr).

Total $H_2$+CO contained in syngas produced in Example 2 (38.7 kgmol/hr) is 83% of that produced in Example 1 (46.7 kgmol/hr). Product syngas purity is essentially identical in Examples 2 and 1, at 86.7% $H_2$+CO and 86.8% $H_2$+CO, respectively.

Temperature profiles through the first 30 stages of the reactors in Examples 1 and 2 are essentially identical. Through stages 31-120, the temperature profile of the reactor in Example 2 is controlled below that of Example 1, yielding reduced oxygen flux and methane conversion. Through stages 121-140, the temperature profile of the reactor in Example 2 is controlled to re-approach the temperature profile of the reactor in Example 1 to yield product syngas of essentially identical purity and methane feedstock conversion as Example 1 but at a reduced production capacity.

Embodiments can be further illustrated by comparing the results of Examples 1 and 2 with certain of the Cases 1 through 9 described earlier and summarized in Table 1. These comparisons are given below.

Case 1 represents the base case for the comparisons below.

Case 2 can be illustrated by comparing Examples 1 and 2 over the first 60 stages, where the group of stages 1-30 can represent the first stage and the group of stages 31-60 can represent the second stage.

Case 4 can be illustrated by comparing Examples 1 and 2 over the last 40 stages, where the group of stages 100-120 can represent the first stage and the group of stages 121-140 can represent the second stage.

Case 5 can be illustrated by comparing Examples 1 and 2 over stages 41-110.

Case 7 can be illustrated by comparing Examples 1 and 2 over the last 40 stages, where the group of stages 100-120 can represent the first stage and the group of stages 121-140 can represent the second stage. For this comparison, Example 2 is used as the base or design case operation and Example 1 is used as the off-design or alternate case operation.

Case 9 can be illustrated by comparing Examples 1 and 2 over stages 41-110. For this comparison, Example 2 is used as the base or design case operation and Example 1 is used as the off-design or alternate case operation.

EXAMPLE 3

Figure 9:
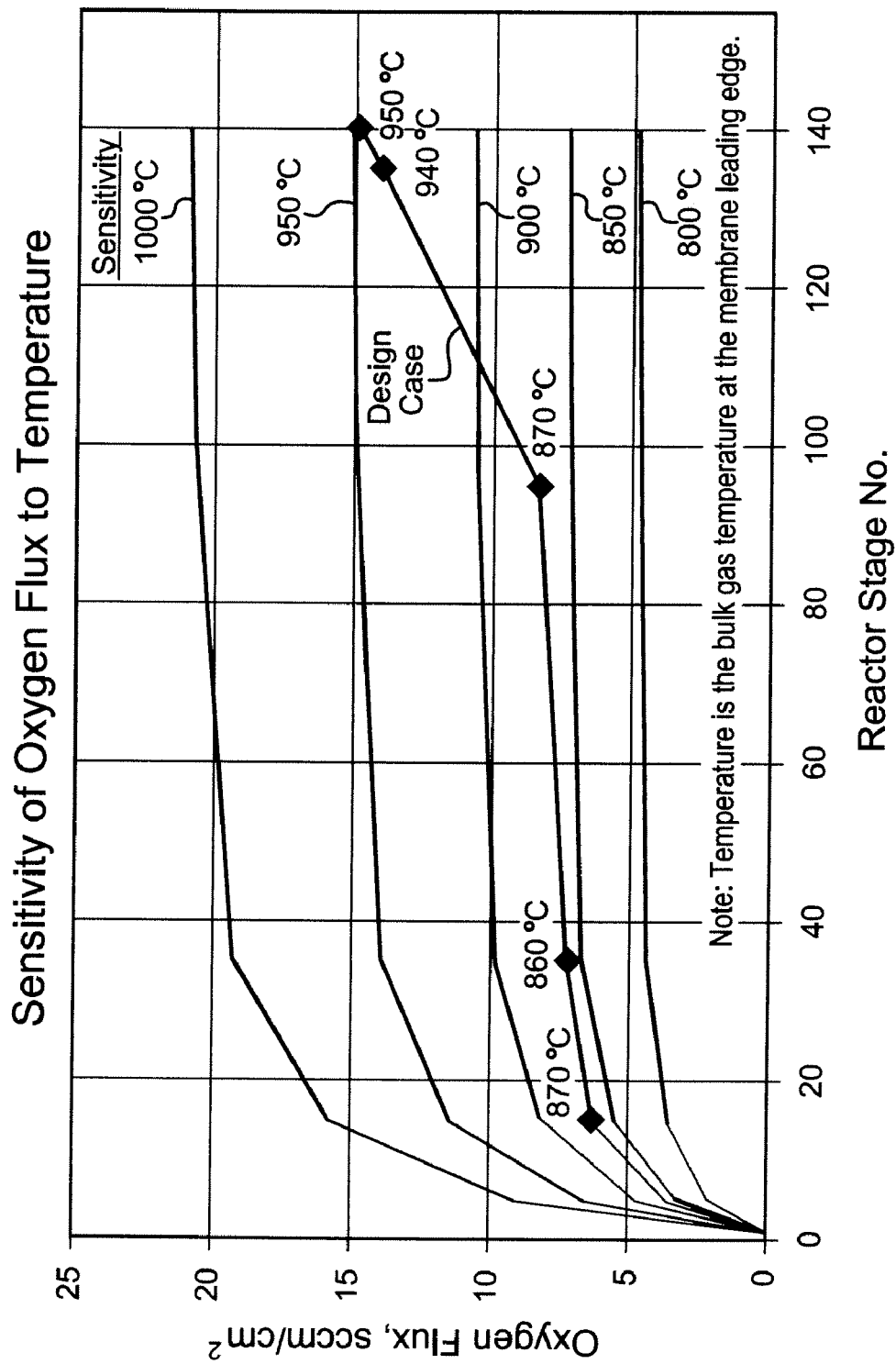
FIG. 9 is a plot of oxygen flux and oxygen flux sensitivities vs. reactor stage number for the operation of a multiple-stage ITM oxidation system of Example 3.

Another 140-stage reactor system, similar to that of Examples 1 and 2, was simulated to calculate oxygen flux vs. stage number through the reactor system. The system was simulated for theoretical operation at 800° C., 850° C., 900° C., 950° C., and 1000° C. to illustrate the sensitivity of oxygen flux to operating temperature along the length of the reactor for isothermal operation. These sensitivity isotherms are given in Table 4 and FIG. 9. It is seen that a 50° C. change in temperature yields a nominal 40% change in oxygen flux. This representative response may be used, for example, to select operating conditions to control syngas production capacity.

The operation of the 140-stage reactor system also was simulated for a base design case to show the oxygen flux profile for a typical membrane reactor system operation. The results of the design case oxygen flux profile is summarized in Table 4 and shown on FIG. 9. The bulk gas temperature profile (at the leading edge of the membranes contained within each labeled stage) is also shown as 870° C. at stage number 15, 860° C. at stage number 35, 870° C. at stage number 95, 940° C. at stage number 135, and 950° C. at stage number 140.

Although the present invention has been described as to specific embodiments or examples, it is not limited thereto, but may be changed or modified into any of various other forms without departing from the scope of the invention as defined in the accompanying claims.

TABLE 4

Synthesis Gas Production
Temperature Profile Sensitivity Cases

| Case | Sensitivity Case Temperature, ° C. | Relative Syngas Product Flow, % | Oxygen Flux at Stage Number, sccm/cm$^2$ | | | | | | | Average of Oxygen Fluxes at Stages 15, 35, 95, 135, sccm/cm$^2$ |
|---|---|---|---|---|---|---|---|---|---|---|
| | | | 1 | 5 | 15 | 35 | 95 | 135 | 140 | |
| Base Design | see below | 92% | 0.11 | 3.60 | 6.36 | 7.28 | 8.36 | 14.11 | 14.92 | 9.03 |
| Sensitivity 1 | 800 | 45% | 0.07 | 2.11 | 3.65 | 4.46 | 4.78 | 4.84 | 4.84 | 4.43 |
| Sensitivity 2 | 850 | 68% | 0.10 | 3.19 | 5.53 | 6.75 | 7.23 | 7.33 | 7.33 | 6.71 |
| Sensitivity 3 | 900 | 100% base | 0.15 | 4.67 | 8.08 | 9.86 | 10.57 | 10.71 | 10.72 | 9.81 |
| Sensitivity 4 | 950 | 142% | 0.21 | 6.61 | 11.45 | 13.97 | 14.98 | 15.18 | 15.18 | 13.90 |
| Sensitivity 5 | 980 | 172% | 0.26 | 8.04 | 13.93 | 16.99 | 18.21 | 18.46 | 18.47 | 16.90 |
| Sensitivity 6 | 1000 | 195% | 0.29 | 9.12 | 15.79 | 19.26 | 20.65 | 20.93 | 20.93 | 19.16 |
| Base Design Temperature vs. Stage Number, ° C. | | | 870 | 860 | — | — | 870 | 940 | 950 | |

I claim:

1. A method of operating a multi-stage ion transport membrane oxidation system comprising:
   (a) providing a multi-stage ion transport membrane oxidation system comprising at least a first membrane oxidation stage and a second membrane oxidation stage, wherein
      (a1) the first membrane oxidation stage comprises a reactant zone having a reactant feed gas inlet and an interstage reactant gas outlet,
      (a2) the second membrane oxidation stage comprises a reactant zone having an interstage reactant gas inlet in flow communication with the interstage reactant gas outlet of the first membrane oxidation stage and a product gas outlet, and
      (a3) an interstage feed gas inlet in flow communication with the reactant zone of the second membrane oxidation stage;
   (b) operating the ion transport membrane oxidation system at operating conditions including a characteristic temperature of the first membrane oxidation stage and a characteristic temperature of the second membrane oxidation stage by
      (b1) introducing a reactant feed gas into the reactant feed gas inlet of the first stage,
      (b2) withdrawing an interstage reactant gas from the interstage reactant gas outlet of the first stage and introducing the interstage reactant gas into the interstage reactant gas inlet of the second membrane oxidation stage,
      (b3) introducing a reactant interstage feed gas into the interstage feed gas inlet of the second membrane oxidation stage; and
      (b4) withdrawing a product gas stream from the product gas outlet of the second membrane oxidation stage;
   wherein the ion transport membrane oxidation system provides the product gas at a production capacity and a product quality; and
   (c) decreasing the production capacity while maintaining the product quality by
      decreasing the characteristic temperature of the first membrane oxidation stage to yield a reduction in oxygen flux through the first membrane oxidation stage, and keeping the characteristic temperature of the second membrane oxidation stage substantially unchanged to yield the product as having essentially identical methane feedstock conversion at the reduced production capacity.

2. The method of claim 1 further comprising increasing the characteristic temperature of the first membrane oxidation stage to yield an increase in oxygen flux through the first membrane oxidation stage to increase the production capacity and keeping the characteristic temperature of the second membrane oxidation stage substantially unchanged.

3. The method of claim 1 wherein the reactant feed gas comprises water and one or more hydrocarbons, the reactant interstage feed gas comprises one or more hydrocarbons, and the product gas stream comprises hydrogen and carbon monoxide.

4. The method of claim 1 wherein each stage of the multi-stage ion transport membrane oxidation system comprises an oxidant zone, one or more ion transport membranes separating the reactant zone from the oxidant zone, an oxidant gas inlet, and an oxygen-depleted oxidant gas outlet.

5. The method of claim 4 comprising introducing an oxidant gas into the oxidant gas inlet of any stage and withdrawing an oxygen-depleted oxidant gas from that stage.

6. The method of claim 5 wherein the characteristic temperature of any stage is controlled by changing one or more operating parameters selected from the group consisting of the reactant feed gas flow rate, the reactant feed gas composition, the reactant feed gas temperature, the reactant interstage feed gas flow rate, the reactant interstage feed gas composition, the reactant interstage feed gas temperature, the interstage reactant gas temperature, and the temperature of the oxidant gas to any stage.

7. The method of claim 1 wherein the multi-stage ion transport membrane oxidation system comprises one or more catalysts disposed within any reactant zone and/or in the interstage reactant gas flow path between the first and second stages.

8. The method of claim 1 wherein the reactant feed gas and/or the reactant interstage feed gas comprises natural gas and/or pre-reformed natural gas.

* * * * *